US008726732B2

(12) United States Patent
Littler et al.

(10) Patent No.: US 8,726,732 B2
(45) Date of Patent: May 20, 2014

(54) SYSTEM, DEVICE AND METHOD FOR DETECTING SEISMIC ACCELERATION

(75) Inventors: Ian C. M. Littler, Balmain (AU); Jong H. Chow, Ainslie (AU); David E. McClelland, O'Connor (AU)

(73) Assignee: The Australian National University, Acton (AU)

(*) Notice: Subject to any disclaimer, the term of this patent is extended or adjusted under 35 U.S.C. 154(b) by 217 days.

(21) Appl. No.: 13/130,040

(22) PCT Filed: Nov. 17, 2009

(86) PCT No.: PCT/AU2009/001496
§ 371 (c)(1),
(2), (4) Date: Aug. 2, 2011

(87) PCT Pub. No.: WO2010/057247
PCT Pub. Date: May 27, 2010

(65) Prior Publication Data
US 2011/0283795 A1    Nov. 24, 2011

(30) Foreign Application Priority Data
Nov. 19, 2008  (AU) ................................ 2008905977

(51) Int. Cl.
G01P 15/08  (2006.01)
G01H 9/00  (2006.01)
(52) U.S. Cl.
USPC ......................................... 73/514.26; 73/653
(58) Field of Classification Search
USPC ....................... 73/514.26, 497, 653
See application file for complete search history.

(56) References Cited

U.S. PATENT DOCUMENTS

| 3,789,674 | A | * | 2/1974 | Anderson et al. | 73/514.26 |
| 4,083,254 | A | * | 4/1978 | Nissl | 73/514.26 |
| 4,567,771 | A | * | 2/1986 | Nelson et al. | 73/653 |
| 5,289,719 | A | | 3/1994 | Egley et al. | |
| 6,422,084 | B1 | | 7/2002 | Fernald et al. | |
| 6,955,085 | B2 | * | 10/2005 | Jones et al. | 73/514.26 |
| 7,139,446 | B2 | * | 11/2006 | Slotwinski | 385/12 |
| 7,920,270 | B2 | | 4/2011 | Chow et al. | |
| 8,305,845 | B2 | * | 11/2012 | Kamata | 367/182 |
| 8,334,984 | B2 | * | 12/2012 | Perez et al. | 356/519 |

(Continued)

FOREIGN PATENT DOCUMENTS

EP    1310801 A1    5/2003

OTHER PUBLICATIONS

International Search Report for PCT/AU2009/001496, date of mailing Jan. 28, 2010.

(Continued)

Primary Examiner — Helen Kwok
(74) Attorney, Agent, or Firm — Hamilton, Brook, Smith & Reynolds, P.C.

(57) ABSTRACT

A device for detecting seismic acceleration includes a proof mass; a base for providing a sensor acceleration, relative to the proof mass, based on the seismic acceleration; and an optical fiber portion operatively connected between the proof mass and the base for providing a fiber tension based on the sensor acceleration. A fiber Fabry-Perot interferometer (FFPI) in the optical fiber portion provides an optical characteristic representative of the fiber tension. A compensator applies a compensating tension to the FFPI to compensate for a change of the optical characteristic due to a temperature change of the FFPI.

20 Claims, 12 Drawing Sheets

(56) References Cited

U.S. PATENT DOCUMENTS

| | | |
|---|---|---|
| 2001/0055438 A1* | 12/2001 | Tweedy et al. .................. 385/12 |
| 2004/0149037 A1* | 8/2004 | Digonnet et al. .......... 73/514.26 |
| 2004/0237648 A1 | 12/2004 | Jones et al. |
| 2006/0219009 A1 | 10/2006 | Maas et al. |
| 2007/0039393 A1 | 2/2007 | Devenyl |
| 2007/0189658 A1 | 8/2007 | Maas |

OTHER PUBLICATIONS

International Preliminary Report of Patentability for PCT/AU2009/001496, date of mailing Oct. 19, 2010.

* cited by examiner

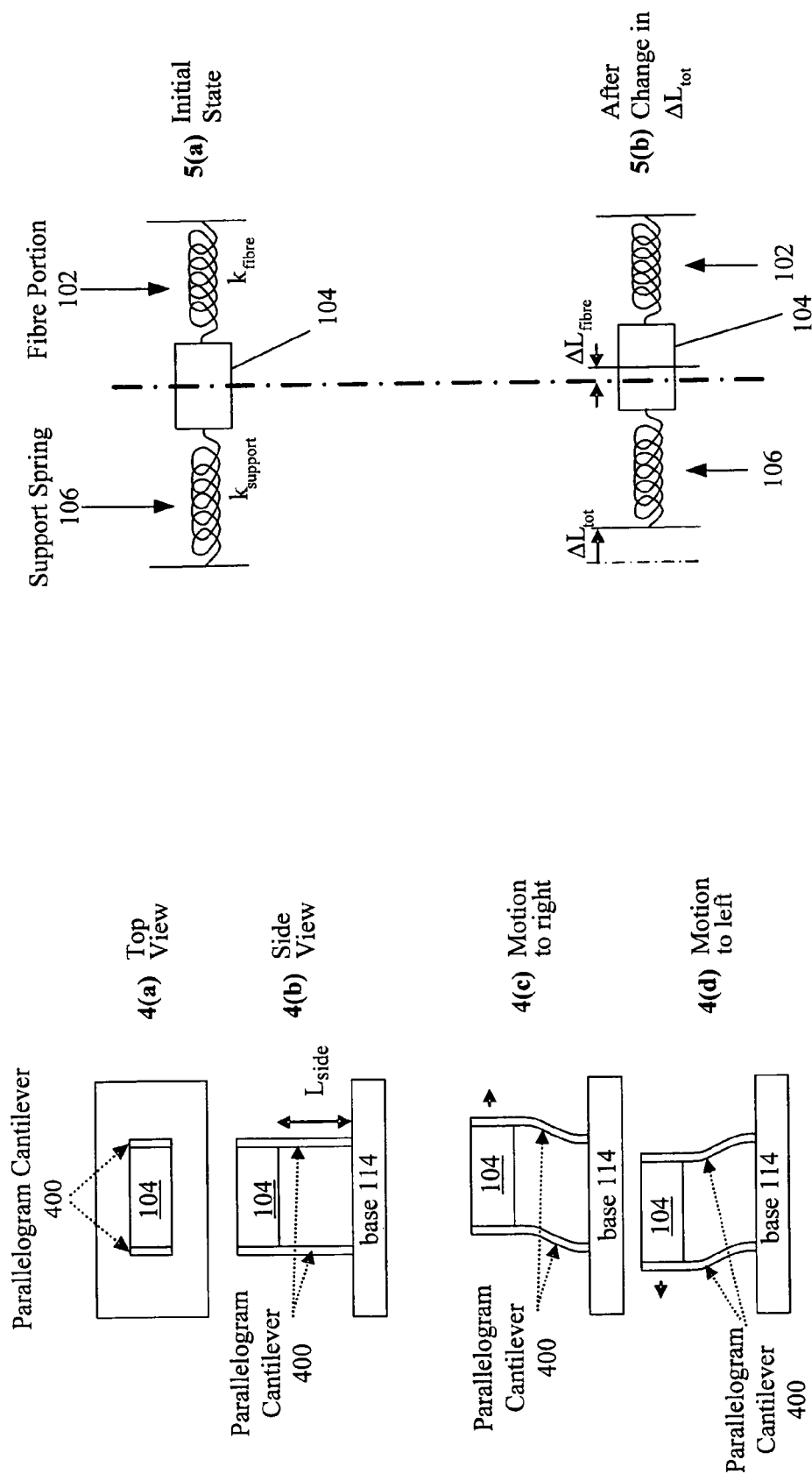

US 8,726,732 B2

SYSTEM, DEVICE AND METHOD FOR DETECTING SEISMIC ACCELERATION

This application is the U.S. National Stage of International Application No. PCT/AU2009/001496, filed Nov. 17, 2009, which designates the U.S., published in English, and claims priority under 35 U.S.C. §§119 or 365(c) to Australian Application No. 2008905977, filed Nov. 19, 2008.

FIELD

The present invention relates to a system, device and method for detecting seismic acceleration. The device is commonly referred to as a geophone. More particularly, the invention relates to detecting seismic acceleration using optical fibre.

BACKGROUND

A geophone is a seismic detector used in seismic imaging. For example, to image rock strata below the ground, a mechanical impulse is used to generate a combination of P-waves (pressure waves) and/or S-waves (shear waves) which penetrate deep into the ground. These seismic waves are reflected from discontinuities in the underground rock strata and are detected by an array of the geophones, placed on the surface, which measure the strength and direction of the mechanical waves. An image of the underlying strata can then be reconstructed.

Existing geophones and geophone systems can be insufficiently sensitive to seismic acceleration at least at some seismic frequencies, and may be unable to sufficiently block unwanted signals/noise, particularly in demanding applications. Existing geophones can be may be undesirably complex, large and/or heavy to manufacture and use. For example, existing geophone can be too large or inconveniently shaped for certain applications, e.g., for use in arrays of geophones underground or on the sea bed. Existing geophone systems can also be prone to degraded performance, malfunction or partial failure in high-temperature, high-pressure environments, or marine environments.

It is desired to address or ameliorate one or more disadvantages or limitations associated with existing geophones and geophone systems, or to at least provide a useful alternative.

SUMMARY

In accordance with the present invention, there is provided a device for detecting seismic acceleration, including:
- a proof mass;
- a base for providing a sensor acceleration, relative to the proof mass, based on the seismic acceleration;
- an optical fibre portion operatively connected between the proof mass and the base for providing a fibre tension based on the sensor acceleration;
- a fibre Fabry-Perot interferometer (FFPI) in the optical fibre portion for providing an optical characteristic representative of the fibre tension; and
- a compensator for applying a compensating tension to the FFPI to compensate for a change of the optical characteristic due to a temperature change of the FFPI.

In embodiments, the proof mass remains stationary while the other parts of the device accelerate, then the proof mass is brought into motion at least by the compensating tension in the optical fibre portion in accordance with Newton's second law.

The proof mass, which can be referred to as a seismic mass, a test mass, or an inertial mass, includes one or more physical bodies (typically joined in-elastically together, e.g., using bolts) that experience acceleration together as one inertial body. The base is in intimate contact with an accelerating body, such as the ground or sea bed, and brings the proof mass into motion via the optical fibre tension.

The FFPI typically includes two co-aligned Bragg reflectors in the optical fibre portion. Using the FFPI can make the device easier to manufacture compared to geophones with long spools of fibre. The FFPI and the optical fibre portion can also have better longevity and corrosion resistance compared to electronic geophones.

For a sinusoidal seismic acceleration, changes in the optical characteristic are substantially sinusoidal and in phase with the seismic acceleration. Below mechanical resonance, the changes in the optical characteristic are substantially in phase with the seismic acceleration.

In embodiments, temperature compensation provided by the compensator allows the optical characteristic of the FFPI to remain aligned in wavelength with the wavelength of an interrogating optical source during environmental temperature fluctuations. For example, the device can be tested in a system at room temperature (e.g., 20° C.) then deployed in a low-temperature environment (e.g., 4° C. on the ocean floor) or a high temperature environment (e.g., 40° C. in rock strata) without requiring recalibration or reconfiguration. Large temperature changes of the fibre portion could otherwise cause the FFPI to drift out of the optical sensor channel defined by a wave division multiplexed (WDM) scheme. For example, in some WDM communication systems, adjacent optical channels are defined to be separated by about 100 GHz; however, in dense wavelength division multiplexing (DWDM) schemes, each optical channel may only be allocated 50 GHz or even 25 GHz of optical bandwidth in which to operate, and the channel width can be less (e.g., 60 GHz for a 100-GHz channel spacing). The optical characteristic of the FFPI, is extremely sensitive to temperature fluctuations, which cause changes in the length and refractive index of the optical fibre forming the FFPI. Typically, the largest change in the optical characteristic of the FFPI, principally the central optical wavelength of the FFPI, is due to refractive index changes in the material of the FFPI. Compensating tension can be applied to the optical fibre based on a temperature change of the compensator, which corresponds to the temperature change of the FFPI when a common environmental temperature is applied to the FFPI and the compensator. The compensator can include an expanding and contracting member, between the base and the proof mass, arranged to change in length (e.g., to expand or contract) in a direction substantially parallel to the FFPI based on the temperature change of the compensator. The compensator can include a first non-expanding member substantially parallel to the FFPI between the base and the expanding member, and a second non-expanding member substantially parallel to the FFPI between the expanding member and the proof mass, wherein the expanding member is arranged to reduce the stress applied to the FFPI as the expanding member expands. The two non-contracting, non-expanding members (which have a generally invariant length for typical changes in environmental temperature) can allow for a more compact arrangement (or topology) of the geophone.

The optical fibre portion is typically in optical communication with an optical fibre for guiding light to interrogate the optical characteristic of the FFPI.

The device typically includes a support spring between the proof mass and the base for holding the optical fibre portion in tension, which allows the geophone to be positioned at an arbitrary angle in respect of the direction of gravity. The support spring can be secured between the proof mass and the expanding member. The support spring can be provided between the proof mass and the second non-expanding member The support spring allows the device to operate in any orientation; however, the optical characteristic will change by a static (DC) amount based on acceleration due to gravity, which can be used to determine the orientation of the geophone on/in the ground.

The support spring can include a first cantilever in the form of a flexible strip secured between the proof mass and the base.

The device can include a guide for substantially limiting the sensor acceleration to be substantially parallel to the FFPI. The guide can include the first cantilever and a second cantilever in the form of a flexible strip between the proof mass and the base, substantially parallel to the first cantilever for guiding the proof mass. The guide can substantially limit the motion of the mass to be only translational motion in the sensing direction (i.e., to one linear degree of freedom), along the axis of the FFPI. The guide typically provides a substantially lower spring constant (about 10, 100, 1000, or more times lower) in the sensing direction than in all other directions or for all rotational/vibrational modes. This allows for mechanical energy to be coupled with greater efficiency into the degree of freedom of the proof mass in the sensing direction than into any other degree of freedom of the proof mass (the parallelogram cantilever is very stiff in all but one degree of freedom, and thus responds very weakly to cross-axial acceleration). Using cantilever springs as the guide can be preferable to using guides based on sliding guide elements, such as hinges or members in slots, because forces due to stiction and friction between the sliding guide elements can severely limit the sensitivity of the device.

The device typically operates non-resonantly, i.e., at a frequency below the mechanical resonant frequency of the device.

The FFPI can be held, by the support spring etc., at a tension selected to tune the FFPI to a predetermined optical wavelength in a wavelength division multiplexing (WDM) scheme. The FFPI typically includes an interferometer formed by two fibre Bragg gratings with a separation selected to tune the FFPI to the desired operating wavelength of the geophone. The tension of the fibre portion can also be selected to tune violin modes of the optical fibre portion out of a seismic acceleration sensing signal band of the geophone: the sensing band is generally from 1 Hz to 10 kHz, or typically 3 Hz to 3 kHz, or more typically 5 Hz to 300 Hz in frequency. A mass of the proof mass as well as a spring constant of the optical fibre portion and support spring can be selected based on a selected sensing band, such as substantially 1 Hz to 10 kHz, or typically 3 Hz to 3 kHz, or more typically 5 Hz to 300 Hz.

A system for detecting seismic acceleration can include:
the device for sensing the seismic acceleration; and
a laser beam for interrogating the optical characteristic of the FFPI to detect the seismic acceleration.

A system for detecting seismic acceleration can include a plurality of single-longitudinal mode laser sources to each provide radiation at a corresponding plurality of selected wavelengths (e.g., in a WDM scheme), and at least one modulator to frequency or phase modulate the radiation from each laser; a plurality of the devices for sensing the seismic acceleration, each device being responsive to one of the said plurality of wavelengths to each produce a reflected or transmitted optical output signal dependent on the optical characteristic of the corresponding FFPI; and one or more demodulators to demodulate the optical output signals and produce a corresponding plurality of measurement signals indicative of optical characteristic of the corresponding FFPIs.

Each laser source can be tunable over a range of wavelengths greater than the spectral width of each corresponding FFPI.

The system can include one or more wavelength controllers configured to control the selected wavelengths of said laser sources. Each wavelength controller can include an external optical cavity to which each corresponding laser source is frequency locked. Each wavelength controller can also be frequency-locked to an external cavity, such as a Mach-Zehnder Interferometer, which is designed to be a stable reference in the band of interest (e.g., against vibration etc.) to reduce or substantially remove frequency drift of the laser source. Each wavelength controller can control the drive current to each corresponding laser source. The modulator can drive an external frequency or phase modulator; alternatively, the modulator can drive the wavelength controller. For example, the controller may control the wavelength for modulation below about 1 MHz using the current control box of the laser source, and for modulation above about 20 MHz using direct connection to the laser diode head of the laser source.

A selected high frequency range output of each demodulator (e.g., passed through a high-pass filter) can provide the measurement signals.

The wavelength controller can be dependent on feedback from the, or each, corresponding demodulator. The feedback can be generated by a selected low frequency range of the, or each, corresponding demodulator output. The feedback is used to maintain each selected wavelength of each laser source at a centre wavelength of each corresponding FFPI, which is typically a main resonant wavelength of the optical characteristic of the FFPI.

Optical radiation from each laser source in the system can be modulated at the same modulation frequency. A modulator can be provided for each laser source, and radiation from each laser source can be modulated at a different modulation frequency. The demodulators can share a common optical detector.

The present invention also provides a method for detecting seismic acceleration, including:
providing a sensor acceleration by a base, relative to a proof mass, based on the seismic acceleration;
providing a fibre tension based on the sensor acceleration by an optical fibre portion operatively connected between the proof mass and the base;
providing an optical characteristic representative of the fibre tension using a fibre Fabry-Perot interferometer (FFPI) in the optical fibre portion; and
applying a compensating tension to the FFPI to compensate for a change of the optical characteristic due to a temperature change of the FFPI.

In embodiments, the method for detecting seismic acceleration can include applying the compensating tension to the FFPI based on a temperature change of a compensator corresponding to the temperature change of the FFPI.

The method can include interrogating the optical characteristic of the FFPI using a laser beam to detect the seismic acceleration.

BRIEF DESCRIPTION OF THE DRAWINGS

Preferred embodiments are hereinafter further described, by way of example only, with reference to the accompanying drawings, which are not to scale, in which:

FIG. 4 is a schematic of the construction and dynamics of a parallelogram cantilever spring of the geophone;

FIG. 5 is a schematic diagram of a proof mass suspended between the support spring and a fibre which acts like a spring;

DETAILED DESCRIPTION

Figure 1:
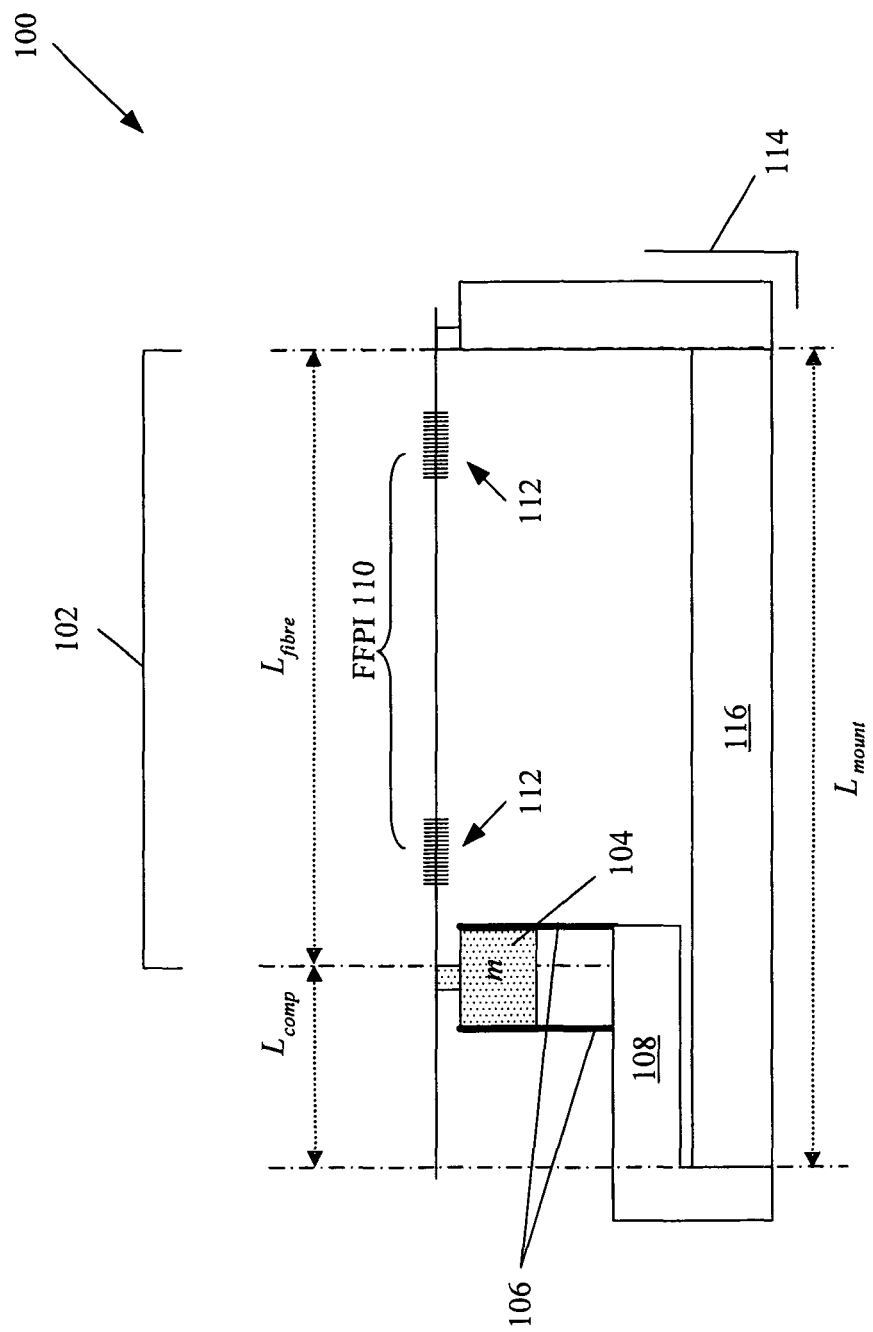
FIG. 1 is a schematic diagram of a device for detecting seismic acceleration in the form of a geophone.

An example device for detecting seismic acceleration is a geophone 100, as shown in FIG. 1, which includes a strain sensor, a proof mass 104, a support spring 106, a thermal compensator and a base 114. The strain sensor includes a fibre portion 102. The proof mass 104 includes a plurality of bodies being generally mechanically fixed relative to each other and moveable relative to the base 114 by means of the support spring 106: in operation, the operational mass of the proof mass 104 includes the mass of the proof mass body and masses of any cooperative bodies that are mechanically fixed to the proof mass body, such as portions of the support spring 106 that are fixed (e.g., bolted) to the proof mass 104. In some embodiments, up to ⅓ of the mass of the support spring 106 can contribute to the mass of the proof mass 104, although this is still typically only a small fraction of the total mass of the proof mass 104. The thermal compensator includes a thermal compensating member 108. The geophone 100 includes a casing, which connects to the base 114, and transmits acceleration from objects adjacent the casing (e.g., from the earth/ground for a geophone on or in the ground) to the base 114.

The geophone detects seismic waves (e.g., S-waves) by measuring the acceleration of the ground within a specific frequency bandwidth using the strain sensor. The desirable bandwidth for the strain sensor can be from about 5 Hz up to about 300 Hz, this range bounded by seismic wave diffraction at low frequencies and attenuation in the earth of the mechanical waves at high frequencies. In the case when the mechanical wave source and detector are sufficiently close, the upper frequency may extend up to about 3 kHz. It may be desirable to operate generally from 1 Hz up to 10 kHz.

The features of the geophone 100 are selected based on the characteristics of: the strain sensor (e.g., the material properties, dimensions and geometry/topology/layout); the seismic acceleration to be detected (e.g., the expected strength and sensing frequency band of the seismic acceleration); a selected resistance to mechanical shock; and a preferred output signal (e.g., an optical output). The characteristics of the output signal include: the bandwidth required, the phase response, a selected sensitivity, a selected immunity to interference from other types of real world signals (e.g., fluctuations in the environmental electro-magnetic fields, temperature, pressure and pressure gradients), and a selected immunity from signals on orthogonal axes or along degrees of freedom not detected by the strain sensor (e.g., acceleration perpendicular to the axis of the strain sensor, rotational motion, rocking motion, etc.).

The strain sensor includes the fibre portion 102 with a fibre Fabry-Perot interferometer (FFPI) 110 based on Bragg gratings 112 acting as mirrors. The fibre portion 102 is linearly strained along its length and not wound on a core. The FFPI 110 is used to measure the fibre tension, or strain, based on a change in phase of light reflecting from or passing through the FFPI 110. Light experiences the phase change as it bounces back and forth between the Bragg gratings 112 in response to a change in strain. The dimensions of the strain sensor are based on the fibre, e.g., 125 μm in diameter and from a few millimeters to several 100 millimeters in length.

Figure 2:
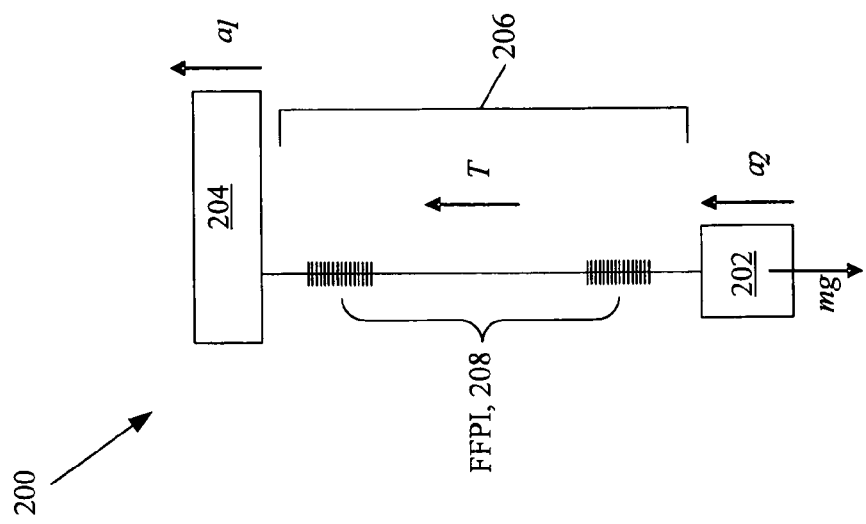
FIG. 2 is a schematic diagram of a free-standing simple harmonic oscillator (SHO)

The geophone 100 operates as a driven simple harmonic oscillator (SHO). A free-hanging simple harmonic oscillator (SHO) 200 includes a test mass 202 suspended from a support structure 204 rigidly attached to the earth/ground by a fibre portion 206 (or length of fibre) containing a FFPI 208, as shown in FIG. 2. The test mass 202 together with the spring constant of the fibre portion 206 and the downward restoring force of earth's gravity (mg) form a simple harmonic motion (SHM) system. Having the test mass 202 attached to the length of fibre is a highly efficient arrangement to convert acceleration into fibre strain. At rest, a tension T in the fibre exactly matches the downward force on the test mass 202 due to gravity mg. The amplitude response of the driven simple harmonic oscillator (SHO) 200 is given by:

$$A(\omega) = \frac{A_0}{\sqrt{\omega^2 \gamma^2 + (\omega^2 m - k)^2}},$$

and the phase response is given by:

$$\phi = \arctan\left(\frac{\omega m - \frac{k}{\omega}}{\gamma}\right),$$

where $A_0$ is a system constant, $\omega$ is the angular frequency of oscillation, k is the spring constant of the fibre portion 206, m is the mass of the test mass 202, and $\gamma$ is the damping coefficient of the SHO in Ns/m.

When the grounded structure 204 accelerates with an upward acceleration $a_1$ in a vertical direction relative to the proof mass 104, additional fibre tension in the fibre portion 206 is created which accelerates the inertial test mass 202 such that acceleration ($a_2$) of the test mass 202 equals the acceleration ($a_1$) of the structure 204. The tension in the fibre portion 206 strains the FFPI 208, which leads to a shift in its optical characteristic, including the optical resonance frequencies of the modes of the FFPI 208. By measuring the shift in the optical resonance, a measure of the acceleration of the grounded structure 204, and thus seismic acceleration, can be determined.

Figure 7:
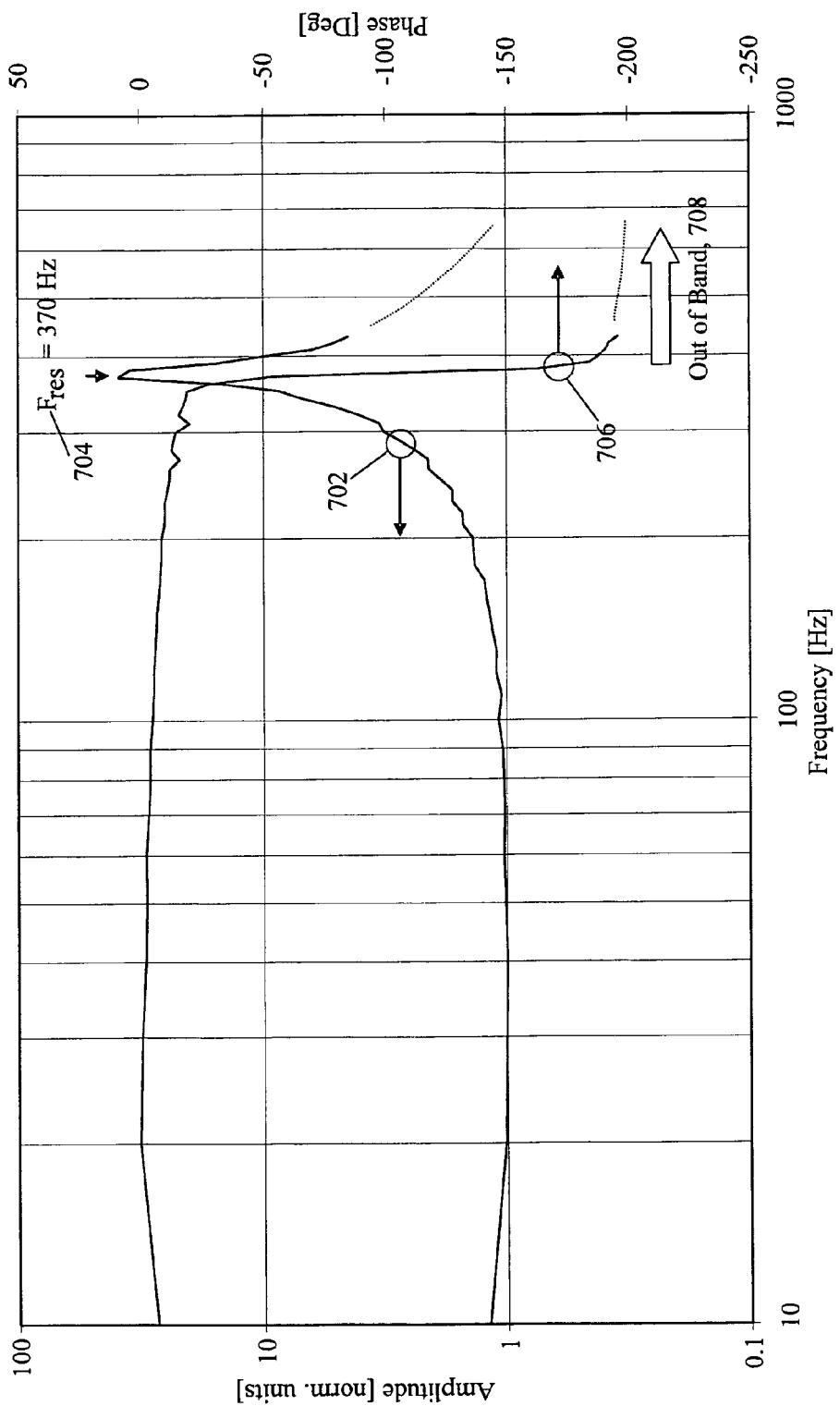
FIG. 7 is a graph of example results from the experimental geophone, showing a measured transfer function.

In the SHO 200, at frequencies below its natural mechanical resonance, the test mass 202 follows the driving force with little phase lag. The geophone 100 thus preferably operates at frequencies below resonance, since there is substantially no phase lag between the inertial mass and the ground undergoing acceleration. At frequencies approaching resonance, the amplitude increases and the test/proof mass's motion begins to lag that of the driving force. On resonance the phase lag between the mass and the driving force changes, abruptly passing through 90°, so that above the resonance the inertial mass's motion lags that of the driving force by 180°. The abruptness of the phase change depends on the degree of damping in the system. The frequency response of the geophone 100 is further described below with reference to FIG. 7.

The mass of the proof mass 104 is selected based on considerations of the desired measurement bandwidth and sensitivity to acceleration. Increasing this mass increases the tension in the fibre portion 102 under acceleration, thus increasing the sensitivity of the geophone 100 to seismic acceleration. However, an increase in this mass also decreases the natural mechanical resonance of the resonant system in the geophone 100, and thus the measurement bandwidth of the geophone 100.

The spring constant $k_{fibre}$ of the fibre portion 206 is related to the length $L_{fibre}$ via Young's modulus E. For example, for a typical fused silica fibre portion of 125 µm in diameter, $$E = \frac{d\sigma}{d\varepsilon} \approx 72 \ GPa,$$

where σ is stress and ε is strain. Therefore, for an example fibre portion 206 with diameter 125 µm, $$L_{fibre} = 884 \cdot \frac{1}{k_{fibre}},$$

and for $L_{fibre}$=0.033 m, $k_{fibre}$=2.68×10⁴ N/m.

The undamped mechanical resonance frequency of the SHO 200 is given by $$F_{res} = \frac{1}{2\pi}\sqrt{\frac{k_{fibre}}{m}},$$

and thus a mass m of the proof mass 104 can be selected based on the relationship:

$$m = \left(\frac{1}{2\pi F_{res}}\right)^2 k_{fibre}.$$

In a preferred geophone 100, the mechanical resonance frequency is only fractionally above the upper frequency of the seismic acceleration signals: e.g., for seismic signals of interest up to 300 Hz, $F_{res}$ can be selected to equal 370 Hz, which corresponds to a test/proof mass of m=4.96 g in the SHO 200.

The relationship between fibre strain and acceleration sensitivity can be determined based on Hookes' law and Newton's second law of motion to yield:

$$a = \frac{k_{fibre}}{m} L_{fibre} \varepsilon,$$

With $$L_{fibre} = 884 \cdot \frac{1}{k_{fibre}}$$

as before, $$a = \frac{884}{m}\varepsilon$$

or in terms of $F_{res}$ and $L_{fibre}$:

$a = 39.5 F_{res}^2 L_{fibre} \varepsilon$.

For a given strain sensitivity, the acceleration sensitivity of the geophone 100 is proportional to the mass of the proof mass 104. In addition, for a given system resonance frequency ($F_{res}$), to achieve maximum acceleration sensitivity, the fibre spring constant ($k_{fibre}$) is selected to be as large as physically possible, i.e., the length ($L_{fibre}$) of the fibre portion 102 containing the FFPI 110 is preferably as short as possible (within size constraints of the FFPI 110).

For the example free-hanging simple harmonic oscillator, and $F_{res}$=370 Hz (which implies that m=4.96 g), L=33 mm, and a typical minimum strain sensitivity for the strain sensor of 2 pε/√Hz, the minimum detectable acceleration is about 36 ng/√Hz, (where g=9.81 m/s², and ng is 9.81×10⁻⁹ m/s²).

The fibre portion 102 is typically held between the proof mass 104 and the base 114 using an adhesive or glue, e.g., as described below with reference to FIGS. 5A and 5B.

The tension in the fibre portion 102 is selected, and experimentally set, by straining the fibre in place between the proof mass 104 and the base 114, and actively measuring the wavelength of the FFPI 110: the fibre strain is tuned to tune the FFPI's characteristic wavelength to a selected wavelength, e.g., a predetermined wavelength channel in a wavelength-division-multiplexed (WDM) scheme. When the selected tension is applied, fasteners (e.g., adhesives, glue or clamps) are placed to hold the fibre portion 102 between the base 114 and the proof mass 104: firstly, the fibre portion 102 is fastened to the proof mass 104; secondly, the fibre is pulled until the FFPI 110 comes into resonance with an interrogating laser source; and lastly, the fibre portion 102 is fastened to the base 114 at the selected tension. With the fasteners in place, the fibre portion 102 is held in place at the selected tension, and thus acts as a strain sensor at the selected wavelength. The clamps include a gentle clamping device i.e., sufficiently gentle to not damage the fibre.

Figure 3:
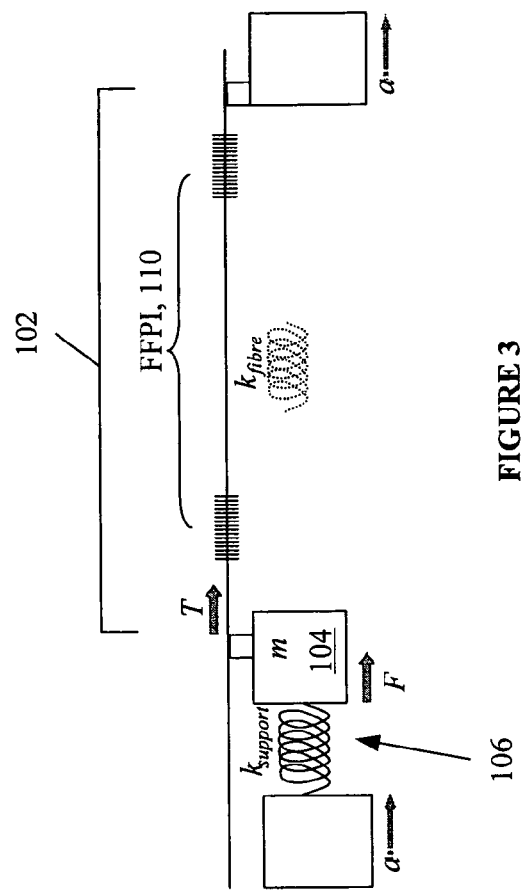
FIG. 3 is a schematic diagram of the geophone showing a support spring.

To allow the geophone 100 to operate/function at any selected angle with respect to gravity (i.e., not only in the vertical direction), the support spring 106 supports the detector mass, holds the optical fibre portion 102 in tension, and if in the form of a cantilever spring, also acts as a guide for guiding motion of the proof mass 104 along the sensing axis, as shown in FIGS. 1 and 3. Without the support spring 106, as shown in FIG. 3, the geophone 100 could not be aligned with the FFPI 110 parallel to the ground, i.e., transverse the direction of gravity. The support spring 106 allows the device to operate in any orientation; however, the optical characteristic will change by a static (DC) amount based on to the force of gravity (mg). This is a large effect compared with seismic variations and can be used to determine the orientation of the geophone 100 on/in the ground (for example, the optical characteristic can change by ±100 µm (Δλ) between a horizontal and a vertical orientation of the FFPI 110 with respect to gravity).

The support spring 106 has a spring constant value similar to the spring constant value of the fibre so that its extension will not be too large, but at the same time a moderate mass may still be used. For a cantilever support spring 106, a matching or similar spring constant can also reduce or eliminate the possibility that other modes of vibration have characteristic frequencies in the band of interest, by ensuring that the possible rotational modes of the cantilever are well out of the signal band.

The force accelerating the doubly sprung proof mass 104 is split between the support spring 106 and the fibre portion 102, thus the resonant frequency of the geophone 100 is given by the SHO relation with a sum of the spring constants:

$$F_{res} = \frac{1}{2\pi}\sqrt{\frac{k_{support} + k_{fibre}}{m}}.$$

Acceleration of the proof mass 104 is related to the forces and spring constants ($k_{fibre}$, $k_{support}$) of the fibre portion 102 and the support spring 106 in the following relationship:

$$a = \frac{k_{tot}}{m}L_{fibre}\varepsilon,$$

with $$k_{tot} = k_{support} + k_{fibre};$$

thus $$a = \frac{(k_{support} + k_{fibre})}{m}L_{fibre}\varepsilon,$$

Or in terms of $F_{res}$ and $L_{fibre}$ $$a = 39.5 F_{res}^2 L_{fibre}\varepsilon.$$

where $k_{fibre}$ is the fibre spring constant, and $L_{fibre}$ is the fibre portion length.

This is an equivalent relationship to that of the free-hanging SHO 200: the acceleration sensitivity depends only on the resonance frequency ($F_{res}$) selected and the fibre spring constant ($k_{fibre}$). The mass of the proof mass 104 in the geophone 100 is greater than the re, free mass in the free-hanging SHO 200 (for the same sensitivity, the resonance frequency and bandwidth) due to the additional spring constant $k_{support}$, which effectively reduces the overall sensitivity of the geophone 100 compared to the free-hanging SHO 200. Using the cantilever support spring 106 guides the motion and provides a restoring force to allow operation in any orientation; however, it also helps the proof mass 104 accelerate, taking some of the tension out of the fibre portion 102, thus reducing overall sensitivity (e.g., by a factor of two for equal spring constants). This may not be much of a disadvantage compared to the advantage of having the proof mass 104 substantially constrained in one degree of freedom.

The support spring 106 is formed by the parallelogram cantilever 400 as shown in FIGS. 4(*a*) and 4(*b*), which acts as a guide for guiding motion of the proof mass 104 along the sensing axis. The parallelogram cantilever 400 constrains the motion of the proof mass 104 substantially to one degree of freedom (one axis of translation), thereby substantially avoiding, reducing or eliminating undesirable modes of vibration/rotation (including characteristic modes or natural resonances of the mechanical system, also known as eigenmodes with eigenfrequencies, in the band of interest), and thus sensitivity of the geophone 100 to motion in these undesirable degrees of freedom. Using the parallelogram cantilever 400 makes it very hard for the system to vibrate in any cross-axial mode, reducing the responsivity of the system to vibration in other modes within the frequency band of interest. Although a single cantilever may possess a low frequency twisting mode, the parallelogram cantilever 400 has motion substantially constrained on one degree of freedom. The parallelogram is sufficiently stiff in all other (i.e., non-axial) directions, that the fundamental resonances of other eigenmodes (including twisting and from orthogonal directions) are outside the frequency band of interest. The lowest eigenfrequency is for the linear left-to-right mode of vibration, as shown in FIGS. 4(*c*) and 4(*d*). The axial motion is extremely small compared to the length of the parallelogram sides ($L_{side}$), thus any radial movement of the proof mass 104 due to the geometry of the parallelogram is insubstantial: for example, the axial motion is typically picometers in length, compared to the length of the parallelogram sides ($L_{side}$) which are millimeters in length, and thus the radial movement of the proof mass 104 is typically substantially less than picometers.

The parallelogram cantilever 400 has very low stiction and friction in comparison to sliding mechanical guides which could substantially constrain motion to one degree of freedom. Thus the geophone 100 avoids sensitivity limitations of such sliding guides.

The parallelogram cantilever 400 includes the two standalone cantilevers joined in the middle: one constrained at the base 114, and the other constrained at the proof mass 104. The spring constant $k_{support}$ for the parallelogram cantilever 400 is given by the relationship:

$$k_{support} = \frac{Ewt^3}{4(L_{side}/2)^3}.$$

A stand-alone cantilever spring is typically a wide rod or bar fixed at one end and free at the other. The bar is thinner across one side making the spring much stiffer for one axis. The spring constant of a simple cantilever beam is:

$$k_{cant} = \frac{Ewt^3}{4L^3},$$

where L is the length of the cantilever beam, w is the width and t is the thickness. The material properties are represented by Young's modulus E. If w is much larger than t, the beam is much more rigid for one axis than the other. Values for the other parameters are selected to give the desired spring constant within manageable dimensions and maintain structural integrity, i.e., robustness to mechanical shocks. For example, for w=7 mm, L=3.0 mm and t=0.15 mm, the cantilever spring constant for a brass cantilever (with E=110 GPa) is given by $k_{cant}$=2.41×10⁴ N/m. This is the same order of magnitude as the fibre spring constant of 2.68×10⁴ N/m.

For an example parallelogram cantilever 400 with parallelogram sides 7 mm in length, the spring constant is equivalent to the spring constant for a single cantilever beam of L=3.0 mm, namely, $k_{support}$=2.41×10⁴ N/m. In the geophone 100, the spring constant for the total system $k_m$ is determined by the addition of the parallelogram spring constant and that of the fibre:

$$k_{tot} = k_{support} + k_{fibre}$$

For example, for $k_{fibre}$=2.68×10⁴ N/m and $k_{support}$=2.41×10⁴ N/m, $k_{tot}$=5.09×10⁴ N/m. For the natural resonance frequency of $F_{res}$=370 Hz, the proof mass 104 has a mass of m=9.43 g. The corresponding acceleration sensitivity, for a strain sensitivity of 2 pε/√Hz, is about 36 ng/√Hz.

The thermal compensator is configured to adjust the tension or strain in the fibre portion 102 to counterbalance thermal strain in the fibre portion 102 due to thermo-optic expansion/contraction and refractive index change caused by temperature changes/fluctuations. The thermal compensator applies a compensating tension to the FFPI 110 to compensate for one or more temperature changes of the FFPI 110. By counter-acting the thermal effects in the doped silica fibre, on which the resonance wavelength of the FFPI 110 depends, the geophone 100 can operate over a large temperature range. For an example fibre Bragg grating with a thermal coefficient of 12.7 µm/K without thermal compensation, if the temperature changes by 40 K, the FFPI optical resonance drifts by about half a nanometer, which moves the resonance outside a typical WDM optical signal channel of the geophone 100.

The thermal compensator includes materials with different coefficients of expansion for mounting the fibre portion 102. The fibre portion 102, with length $L_{fibre}$ and a thermo-optic coefficient $C_{th}$, is fixed at either end on a mount or base 114 that includes the thermal compensator. The thermal compensator, as shown in FIG. 1, includes a mount member 116 of material with low coefficient of expansion (e.g., FeNi36, or "Invar" from ArcelorMittal) and the compensating member 108 of material with a relatively high coefficient of expansion (e.g., Aluminium, steel, stainless steel or brass). The coefficients of linear expansion for the two materials are $C_{mount}$ (for the mount member 116) and $C_{comp}$ (for the compensating member 108), and corresponding lengths are $L_{mount}$ and $L_{comp}$ (the lengths are measured from the joining points where they meet the proof mass 104 and the support base 114). The optical resonance frequency dependence on temperature change of the fibre can be expressed as a change in wavelength:

$$\Delta\lambda = C_{th}\Delta T.$$

The thermal expansion $\Delta L_{tot}$ of the total length $L_{tot}$—that is, the change in total length of the base 114 between the fixed points holding the fibre portion 102 in tension—arises from a combination of the compensating member 108 and the mount member 116, arranged in an folded geometry (as shown in FIG. 1), as follows:

$$\Delta L_{tot} = (C_{comp}L_{comp} - C_{mount}L_{mount})\Delta T.$$

When the fibre portion 102 is strained, the wavelength λ of each Bragg grating 112 changes according to:

$$\frac{\partial \lambda}{\partial \sigma} = \frac{\lambda}{n_{eff}}\frac{dn_{eff}}{d\sigma} + \frac{d\lambda}{d\sigma}.$$

Inserting the expression for Young's modulus $$E = \frac{d\sigma}{d\varepsilon}$$

yields:

$$\frac{d\lambda}{d\varepsilon} = \lambda\left[\frac{E}{n_{eff}}\frac{dn_{eff}}{d\sigma} + 1\right].$$

With $$\frac{dn_{eff}}{d\sigma} = -6\times 10^{-3}/GPa,$$

$n_{eff}$=1.46 and E=72 GPa, the following expression relates changes in the length of the fibre portion 102 ($dL_{fibre}$) the wavelength shift dλ:

$$\frac{d\lambda}{dL_{fibre}} = 0.70\frac{\lambda}{L_{fibre}}$$

In order to compensate the thermal drift of the FFPI 110, the tension of the fibre portion 102 in the geophone 100 is adjusted via changes in the length ($\Delta L_{tot}$). Since the FFPI 110 is mounted between two springs, changes in the fibre length $L_{fibre}$ due to the change in the total length ($\Delta L_{tot}$) depend on the relative strengths of the two spring constants, as shown in FIG. 5. When the geophone 100 is at rest (i.e., no substantial applied acceleration), the tensions in both springs (i.e., the fibre portion 102 and the support spring 106) are substantially the same. The change in fibre tension due to the change in the length of the fibre is given by $$\Delta T = k_{fibre}\Delta L_{fibre}.$$

By the addition of the spring constants for the springs in series, the change in the tension due to the change $\Delta L_{tot}$ is given by:

$$\Delta T = \frac{k_{fibre}\cdot k_{support}}{(k_{fibre}+k_{support})}\Delta L_{tot}.$$

Equating the two proceeding expressions relates the change in the total length of the base 114 ($\Delta L_{tot}$) to the change in length of the fibre portion 102 ($\Delta L_{fibre}$):

$$\Delta L_{fibre} = \frac{k_{support}}{(k_{fibre}+k_{support})}\Delta L_{tot},$$

So that $$\Delta\lambda = 0.70\lambda\frac{k_{support}}{(k_{fibre}+k_{support})}\frac{\Delta L_{tot}}{L_{fibre}},$$

and $$\frac{\Delta\lambda}{\Delta T} = 0.70\lambda\frac{k_{support}}{(k_{fibre}+k_{support})}\cdot\frac{(C_{comp}L_{comp}-C_{mount}L_{mount})}{L_{fibre}}.$$

The length of the mount, $L_{mount}=L_{comp}+L_{fibre}$, is adjusted by the length of the compensator such that the FFPI wavelength drift with temperature is compensated as follows:

$$L_{comp} = \left(9.22\times 10^5 C_{th}\frac{(k_{fibre}+k_{support})}{k_{support}} + C_{mount}\right)\frac{L_{fibre}}{(C_{comp}-C_{mount})}. \quad [A]$$

For an exemplary geophone 100, $C_{th}$=12.7 pm/K, $C_{mount}$=1×10$^{-6}$/K and $C_{comp}$=23×10$^{-6}$/K, (e.g., for an Aluminium compensating member 108) and for the spring constants, $k_{fibre}$=2.68×10$^4$ N/m and $k_{support}$=2.41×10$^4$ N/m, a fibre length $L_{fibre}$=33 mm requires the length of compensating material $L_{comp}$=39 mm and the length of the low expansion mounting material $L_{mount}$=72 mm. The value of $C_{comp}$ is selected by selecting the material of the compensating member 108.

The thermal compensator may have a folded topology, or arrangement or geometry, to form a folded geophone 500 with a thermal compensator including an expanding bar 502 (e.g., made from Aluminium, steel, brass or stainless steel), which allows for temperature compensation while providing a geophone length in the sensing direction to be substantially equal to the length of the optical fibre portion 102, thus providing a compact geophone.

Figure 5A:
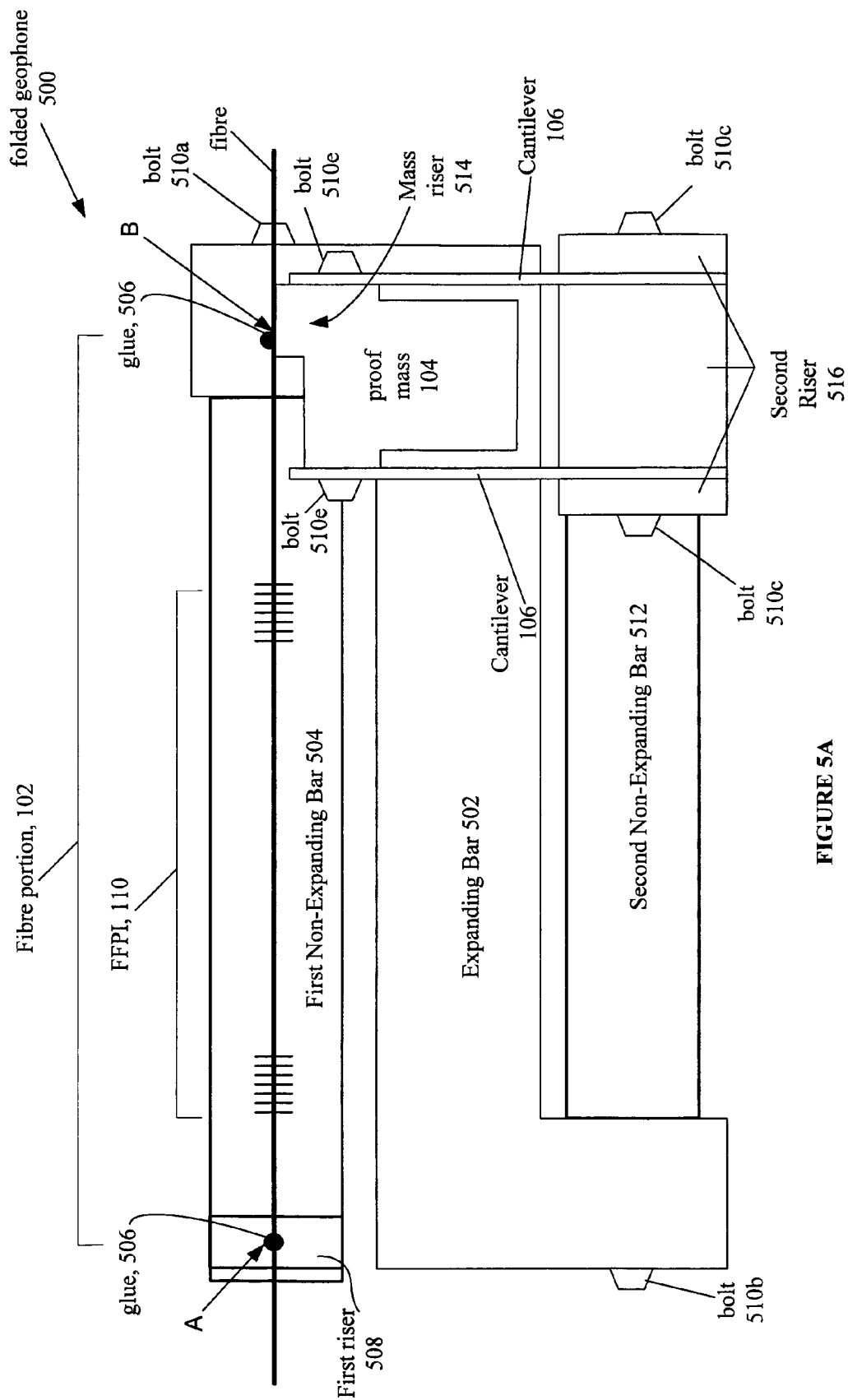
FIG. 5A is a schematic diagram of a top view of the geophone in a folded geometry.
Figure 5B:
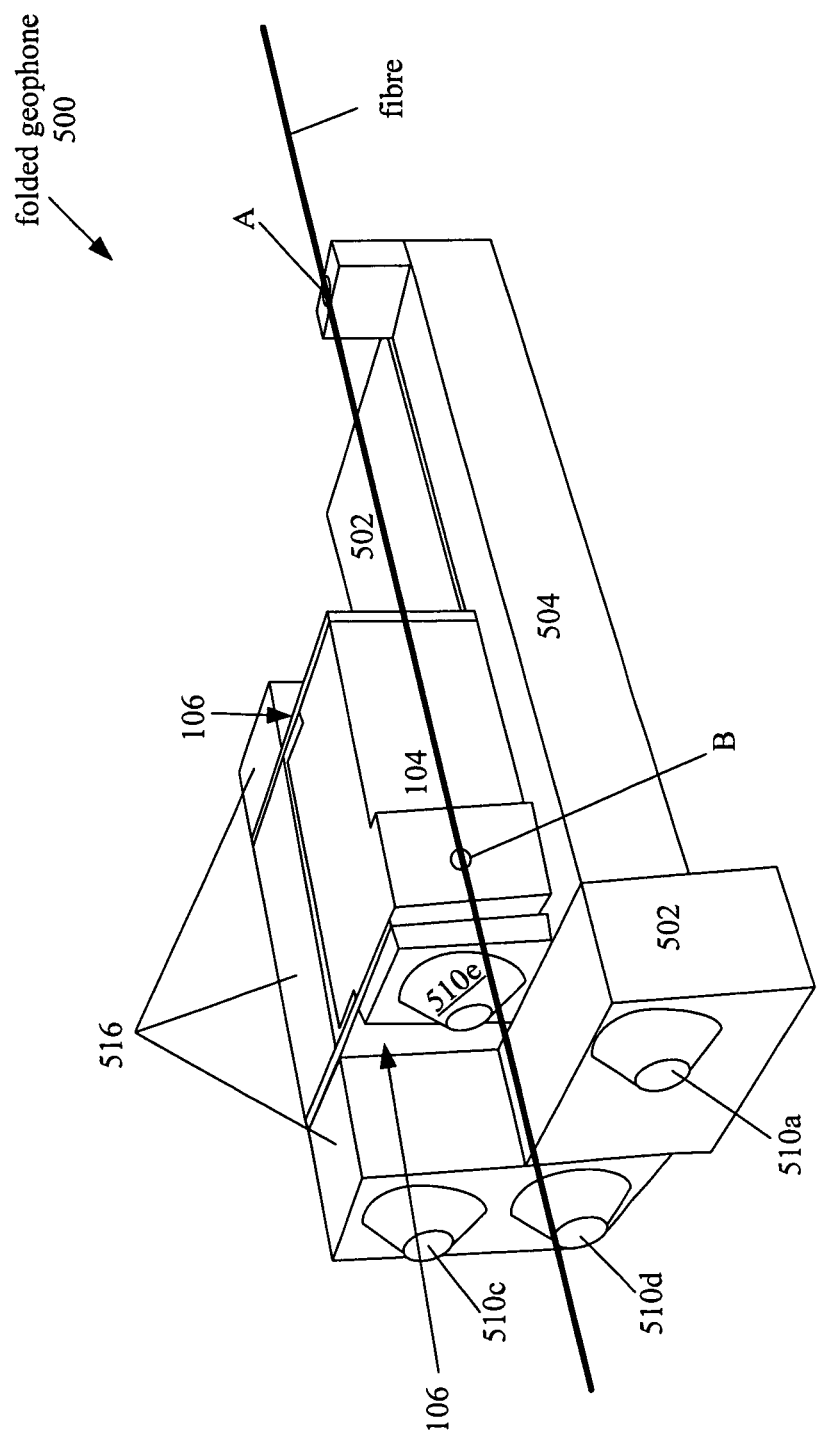
FIG. 5B is a schematic diagram of a perspective view of the folded geophone.

In the folded topology, as shown in FIGS. 5A and 5B, a first end of the fibre portion 102 is attached to a first non-expanding bar 504 (e.g., made from "Invar") at a point A using a fastener (e.g., adhesive or glue 506), and the second end of the fibre portion 102 is attached to the proof mass 104 at point B using a further fastener (e.g., adhesive or glue 506). The fibre portion 102 is strain tuned before the fasteners fix the fibre portion 102 in place: strain tuning allows the characteristic response of the FFPI 110 to be tuned to a selected wavelength to fit in a WDM scheme.

The first non-expanding bar 504 extends generally along the length of, and generally parallel to, the fibre portion 102 from point A, lying "underneath" the fibre portion (with "down" being into the page of FIG. 5A), with point A being raised "above" the first non-expanding bar 504 using a first riser 508 (i.e., a generally rigid connecting member). The first non-expanding bar 504 is connected at its end distant from point A to the expanding bar 502 using a threaded fastener in the form of a bolt 510a. The expanding bar 502 extends from its connection point to the first non-expanding bar 504 back along the length of the first non-expanding bar 504 (and therefore along the length of, and generally parallel to, the fibre portion 102) for a distance not substantially greater than the length of the fibre portion 102, and preferably less than the length of the fibre portion 102. The length of the expanding bar 502, $L_{comp}$, is selected based on the requirements of the thermal compensator in the Equation [A] above. At the end of the expanding bar 502 proximate point A, i.e., the end distant from the connection between the first non-expanding bar 504 and the expanding bar 502, the expanding bar 502 is connected to a second non-expanding bar 512 (e.g., made from "Invar"), using a bolt 510b. The second non-expanding bar 512 extends—from its connection point to the expanding bar 502—generally parallel to and back along the length of the expanding bar 502. The fibre portion 102, the first non-expanding bar 504, the expanding bar 502 and the second non-expanding bar 512 lie generally parallel to each other.

The cantilevers are fixed at their fixed ends near the end of the second non-expanding bar 512, distant from its connection to the expanding bar 502, by bolts 510c and a second riser 516, which forms an additional mount attached to the end of the second non-expanding bar 512 (by bolt 510d). The fixed ends of the cantilevers ends are clamped between blocks of the second riser 516, and held in position by the bolts 510c, and the second riser 516 is attached to the end of the second non-expanding bar 512 by bolt 510d. The second riser 516 holds the proof mass 104 and the cantilevers in a plane generally parallel to the plane of the thermal compensator (which includes the first non-expanding bar 504, the expanding bar 502 and the second non-expanding bar 512) but generally aligned with the fibre portion 102. The cantilevers extend towards the line of the optical fibre portion 102. The proof mass 104 and the cantilevers are fixed together by bolts 510e. The proof mass 104 between the two cantilevers has a mass riser 514 at the end of the proof mass 104 most generally distant from the point A where the second end of the fibre portion 102 is affixed, at the point B. The fibre portion 102 is affixed to the mass riser 514 at the point B with the glue 506.

The first non-expanding bar 504, the expanding bar 502 and the second non-expanding bar 512 form a bimetal mount for temperature compensation. As the expanding bar 502 changes length in response to changing ambient (or environmental) temperature, the distance between points A and B changes, since the non-expanding bars 504, 512 are relatively non-expansive. The expanding bar 502 becomes longer with rising temperature and hence the points A and B become closer, reducing the tension in the fibre and decreasing the wavelength of the Bragg mirrors of the FFPI 110. The converse occurs for falling temperature: the expanding bar 502 becomes shorter and the tension in the fibre is increased. For a correctly selected length of the expanding bar 502, and thermal expansion coefficients for the first non-expanding bar 504, the expanding bar 502 and the second non-expanding bar 512, any change in the wavelength of the optical characteristics of the FFPI 110 in the fibre portion 102 due to the ambient temperature change is compensated by a corresponding change in tension of the fibre portion 102 due to the length change of the underlying bimetal mount. The fibre attachment point B on the mass riser 514 of the proof mass 104 is preferably distance from the point A (i.e., off-centre compared to the proof mass centre) to minimise the required length of the folded geophone 500 for a given sensitivity (e.g., dictated by the fibre portion length). The proof mass 104 generally fills over 50% of the space (volume) between the two cantilevers (as shown in FIGS. 5A and 5B), and may substantially fill this space, which also reduces the required size of the folded geophone 500.

Effects of temperature variation of the spring constants of the fibre portion 102 and the support spring 106 are generally insubstantial compared to the effects of length change in the thermal compensator and thermo-optic changes in the fibre portion 102. The temperature dependence of Young's modulus for a typical metal, brass, is about $-5\times10^{-5}$/° C., i.e., it becomes less stiff with temperature, whereas for fused silica Young's modulus is about $1\times10^{-4}$/° C., i.e., becoming stiffer as the temperature increases. The differing value for Young's modulus leads to a proportional change in the spring constants; this has very little impact on the apportioning of length change due to the close ratios of the spring constants. Changes in the spring constants with temperature can lead to changes in the tension in the fibre and thus changes in the measured signals; however, the magnitudes of these changes are insubstantial compared to changes due to expansion/contraction of the thermal compensator and thermo-optic changes in the fibre portion 102. As the temperature changes, the FFPI resonance changes according to the spring constants $k_{support}$ and $k_{fibre}$ as follows:

$$\frac{\Delta\lambda'}{\Delta\lambda} = \frac{\left(\frac{1}{k_{support}} + \frac{1}{k_{fibre}}\right)}{\left(\frac{1}{k'_{support}} + \frac{1}{k'_{fibre}}\right)}.$$

For example, for the FFPI 110 initially tension strain-tuned by 1 nm, a change in the cantilever spring constant of 0.5 per/mil/° C., causes a change in the FFPI resonance of about −0.2 μm/T, which is insubstantial compared to other temperature dependences.

The tension in the fibre portion 102 is selected to substantially avoid violin modes in the fibre portion 102 coupling energy into and out of the geophone 100 at frequencies below the fundamental resonance of the cantilever/fibre/inertial mass system.

The fundamental resonance frequency of a taut string is given by:

$$F_l = \frac{\sqrt{\frac{T}{\rho_l}}}{2L},$$

where L is the length of the string, T is the tension and $\rho_l$ is the mass per unit length. For example, an uncoated optical fibre of outer diameter 125 μm, with silica density 2.65 g/cm$^3$, possesses a mass per unit length ($\rho_l$) of $3.26\times10^{-5}$ kg/m. As an example, a tension in the fibre portion 102 of T=0.8 N results in a fibre strain tuning of about 1 nm, which for a length of 3.3 cm yields a fundamental violin mode resonance of $F_l$=2.38 kHz. This is above the preferred natural resonance frequency of about $F_{res}$=370 Hz and hence out of band.

The minimum preferred tension in the fibre portion 102 for the fundamental violin mode is about 0.036 N, based on L=3.3 cm, $\rho_l$=3.26×10$^{-5}$ kg/m and minimum $F_l$=500 Hz. The value of the minimum preferred tension increases quadratically with the length of the suspended fibre.

The mass of the proof mass 104 is selected to be sufficiently low to avoid damaging/breaking the geophone 100 due to typical shocks, such as due to a sudden impact. As the proof mass 104 is held between the two springs, any force accelerating the mass will be exerted evenly on the fibre portion and the support spring. For an example mass of 10 grams for the proof mass 104, an acceleration of 2000 m/s$^2$ or ~204 g applied to the geophone 100 generates a force of 20 N on the proof mass 104, which corresponds to about 10 N on the fibre portion, which is an example fibre breaking tension (equivalent to a strain of 1%, i.e., a force sufficient to tune the FFPI 110 by about 12 nm). For an equivalent shock not applied directly along the geophone axis, the resulting force on the fibre portion will be much less. Most electronic equipment is shock tested according to IEC 68-2-32 which involves a drop test from 2 m onto concrete and, for a typical plastic casing, a deceleration equivalent to 55 g.

In an experimental example, a low voltage piezoelectric transducer (PZT) was attached to a test geophone. The test geophone had an effective proof mass 104 of about 11.62 grams: the effective inertial mass included ⅓ of the mass of the cantilever beams. The total spring constant of the fibre and cantilever system was about 6.3×10$^4$ N/m. The mass of the test geophone was about 50 grams in total. The PZT had an unloaded resonance frequency greater than 500 kHz, a loaded resonance frequency greater than 10 kHz, and capacitance C=110 nF. The driving frequency did not exceed 1 kHz, which meant that the current requirements to drive the PZT were well within the capabilities of a typical signal generator. An acceleration calibration signal was applied at 100 Hz via the PZT to generate a scale for the vertical axis of the results graph in terms of acceleration.

Figure 6:
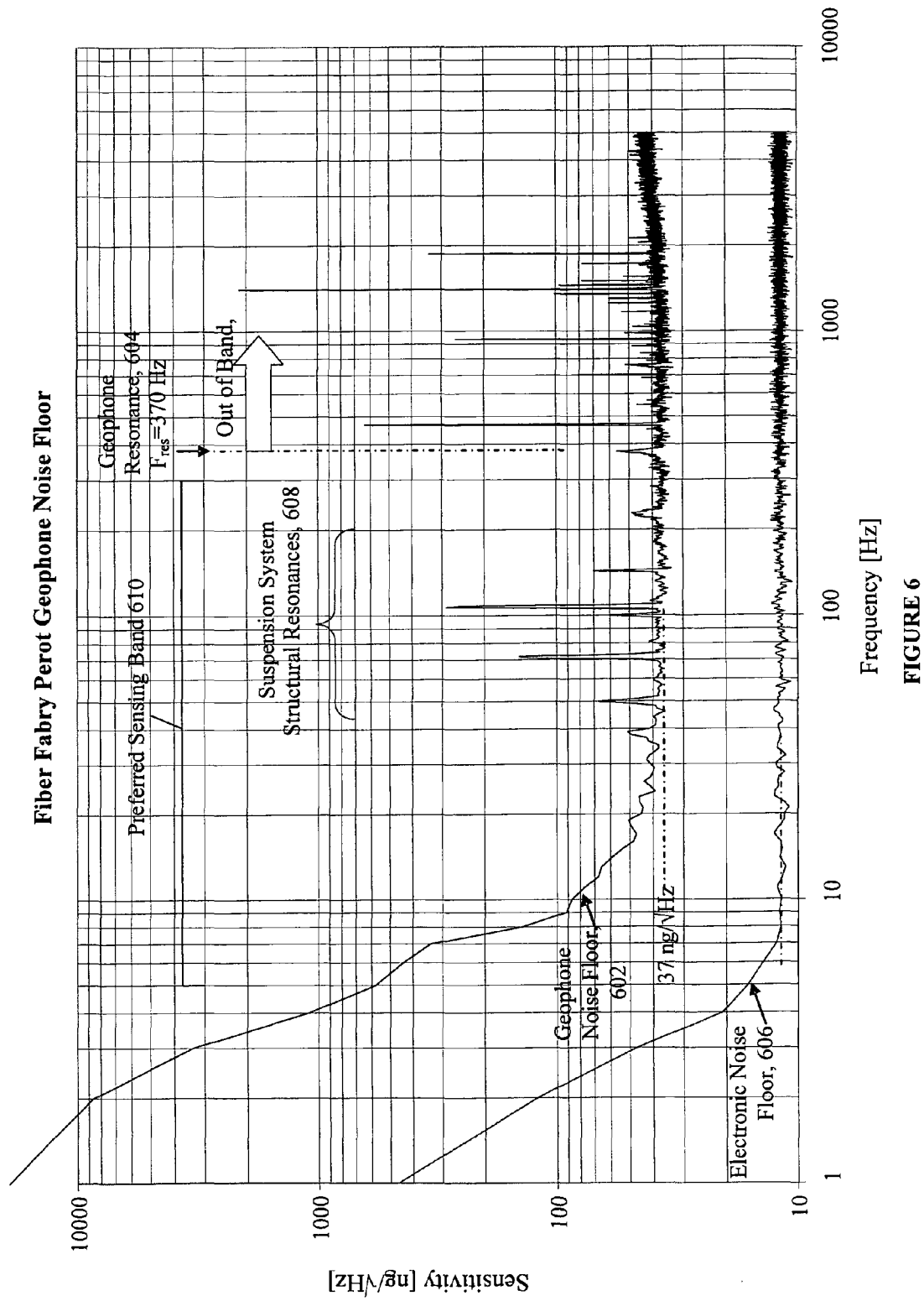
FIG. 6 is a graph of example results from an experimental geophone, showing a measured noise floor.

The geophone noise floor 602 was measured by placing the test geophone on a vibration-isolated table, enclosed in an acousto-mechanically isolated enclosure. The geophone noise floor is substantially flat at 37 ng/√Hz from about 20 Hz to about 1 kHz, as shown in FIG. 6. At 10 Hz, the noise floor is 90 ng/√Hz, but then rolls up steeply to lower frequencies: this is seismic roll-up due to difficulty of seismically isolating the test geophone as the frequency becomes lower. The mechanical resonance 604 of the system was at 370 Hz, as shown in FIG. 6, excited by environmental noise entering the isolated system. The electronic noise floor 606 of the detection system was substantially below 20 ng/√Hz as shown in FIG. 6.

Background structural resonances 608 are associated with the structure used to suspend the isolation stage on which the test geophone was tested. The structural resonances 608 are observed to change frequency under different loading conditions of the optical table and hence were not characteristic of the test geophone itself. The resonances above 370 Hz are out of the preferred sensing band 610 (about 5 Hz to 300 Hz) of the test geophone.

The acceleration noise floor of 37 ng/√Hz was directly related to the strain noise floor which, in turn, was limited by the laser frequency noise. In this case, the equivalent strain noise floor for this acceleration sensitivity was ~2 pε/√Hz.

The response of the test geophone to an external driving force, known as the transfer function, was measured with a total spring constant of about 6.3×10$^4$ N/m and a mass of 11.62 grams of the proof mass 104. A first line 702 in FIG. 7, with an arrow pointing to the left axis, represents the amplitude of the response of the test geophone to a constant sinusoidal acceleration. The fundamental cantilever/fibre resonance 704 occurs at 370 Hz and was about thirty times the non-resonant response at that frequency. Above the resonance, the response falls off as 1/F$^2$, as expected of a driven SHM system. The second line 706 in FIG. 7, with a right-pointing arrow, represents the phase response of the test mass, and hence fibre tension, to the motion and strain of the geophone base or casing. The measured acceleration closely tracks the actual acceleration from 10 Hz up to about 30 Hz below the mechanical resonance. From 10 Hz to 300 Hz the measured phase lag was no more than 15 degrees.

As the frequency was tuned through resonance, the phase transitioned rapidly, so that the phase difference between below and above resonance was about 180 degrees, corresponding to the expected phase change at resonance in a driven SHM system. Above the resonance, the phase response flattens out again, gradually disappearing into the measurement noise (into the 'out of sensing band' frequencies 708).

The mechanical resonance is preferably well outside the frequency band of interest, since it is difficult to calibrate the geophone and/or an associated measurement system for such a rapid change in phase.

Figure 8:
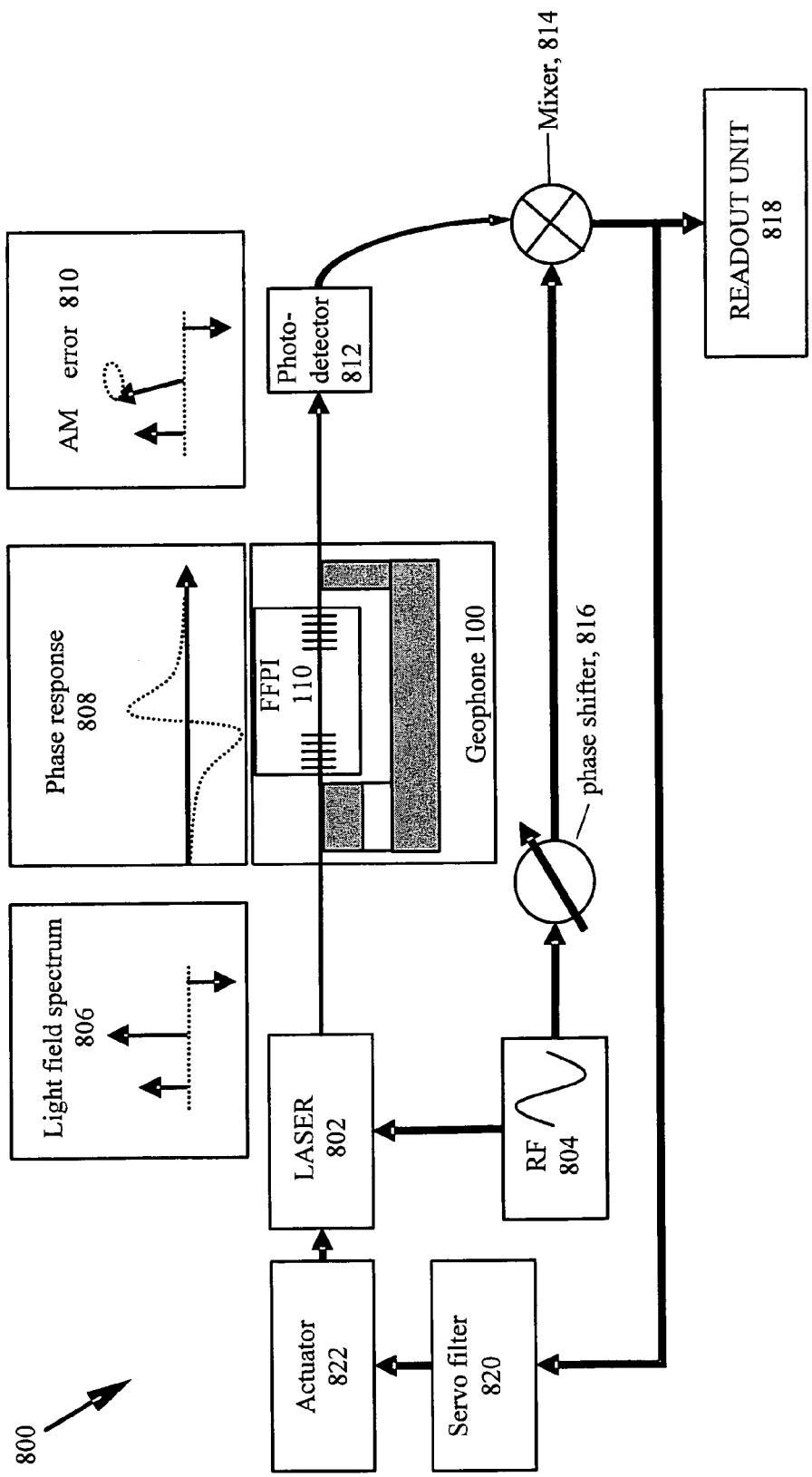
FIGS. 8 to 12 are schematic diagrams of systems for detecting seismic acceleration including the geophone.

A seismic detector system 800, as shown in FIG. 8, including a laser 802, is configured for interrogating the geophone 100 by transmission of light through the FFPI 110. The laser 802 is phase modulated with a radio-frequency (RF) signal from an RF generator 804. A light field (laser beam) with a phase-modulated spectrum 806 from the laser 802, including the carrier and phase-modulated optical sidebands, is transmitted through (or reflected from) the FFPI 110 of the geophone 100. The FFPI 110 has an optical phase response 808 which varies sharply with wavelength.

The geophone 100 alters the resonance wavelength of the FFPI 110 in response to the seismic acceleration which, in turn, differentially alters the phase of the carrier relative to radio-frequency RF phase modulated (PM) sidebands in an optical beam passing from or through the FFPI 110. The result is an amplitude modulated (AM) "error" output signal (with an amplitude modulated spectrum 810, as shown in FIG. 8) at the photo-detector 812, which is generally proportional to the seismic acceleration signal after being mixed down (using a mixer 814 driven by a signal—shifted in phase by a phase shifter 816—from the RF generator 804) to baseband. The demodulated output signal is displayed and/or recorded on a read out unit 818 and fed back to the laser 802, in a low bandwidth loop (including a servo filter 820), to allow an actuator 822 to track the laser's central optical wavelength to slow variations in the FFPI resonance wavelength due to, for example, thermal effects not exactly compensated by the thermal compensator, which are typically on a faster time scale than that at which the compensator can respond.

Figure 9:
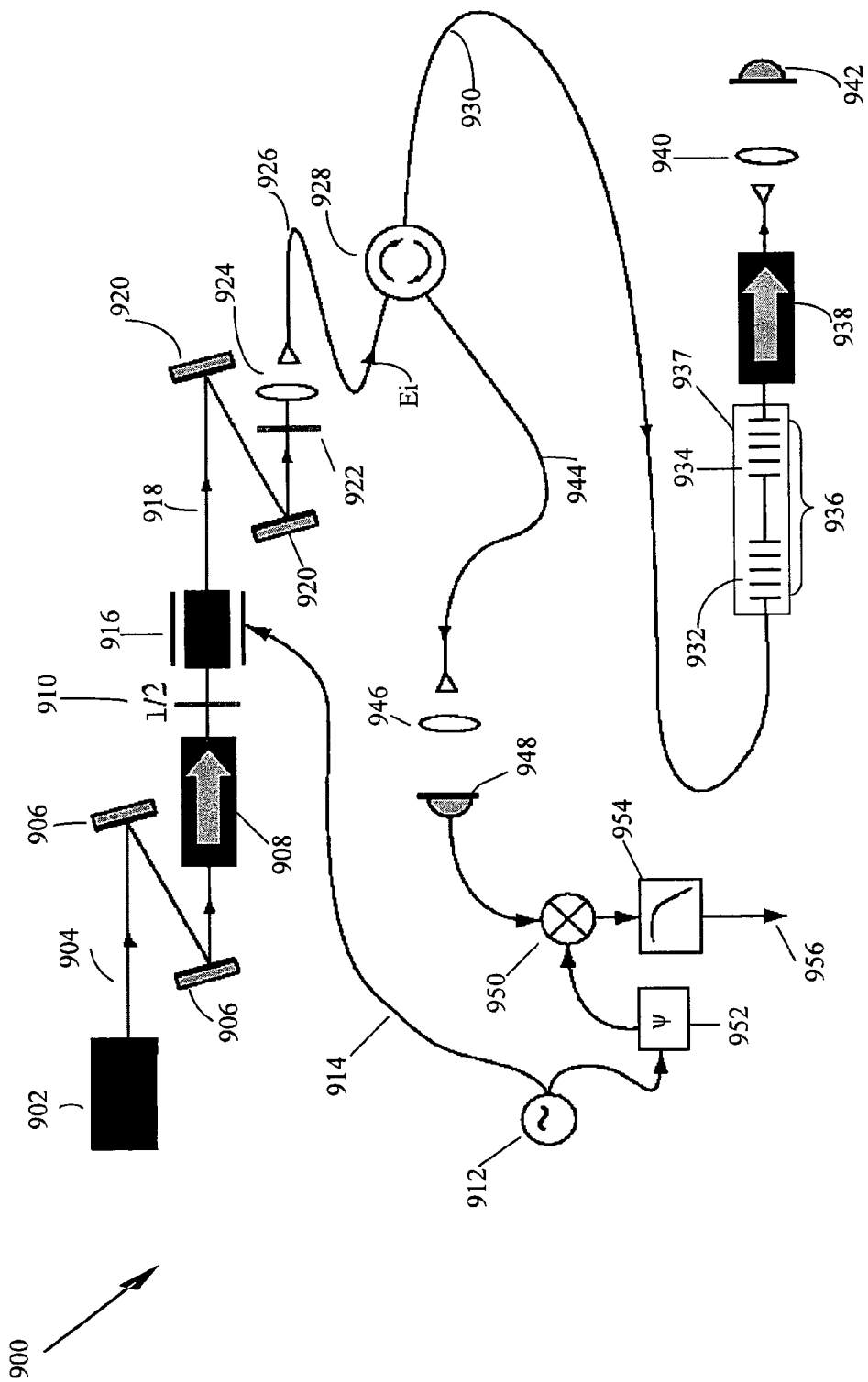

In an exemplary system 900 of the seismic detector system 800, as shown in FIG. 9, the laser 802 generates a beam 904 that is directed via mirrors 906 to an isolator 908, used to block optical reflections that might otherwise propagate back into the laser. A half-wave plate 910 is used to adjust the polarisation of the beam before the beam is frequency-modulated using an external phase modulator 916. The phase modulator 916 is driven by signal generator 912. The modulated beam 918 is directed via mirrors 920 to a second half-waveplate 922 and lens 924, which focuses the beam into a length of optical fibre 926. The incident beam Ei travels via an optical circulator 928 and a second length of fibre 930 to a FFPI 936 formed from two Fibre Bragg Gratings 932 and 934 in an example geophone 937.

A portion Er of the incident beam Ei is reflected by the interferometer (FFPI) 936; this portion Er is reflected back along the fibre 930 via the circulator 928 to a third length of fibre 944, which delivers the reflected beam, via focussing lens 946, to an optical detector or photodetector 948. The reflected portion Er, and thus the signal detected by the reflection photodetector 948, depends on the reflective properties of the interferometer 936, which in turn depend on the optical length of the interferometer 936. The signal detected by the reflection photodetector 948 is mixed down with a mixer 950 to provide a measurement signal, or error signal, 956, which is indicative of the optical length of the interferometer 936. The mixer 950 uses a demodulation signal that has a fixed phase relationship, set by phase shifter 952, to the signal generator 912. A low-pass filter 954 may be used optionally to filter high-frequency noise from the error signal 956.

Another portion of the incident beam is transmitted by the interferometer 936, through a second optical isolator 938 and focussing lens 940, to a transmission photodetector 942. In a manner similar to the signal from the reflection photodetector 948, the signal from the transmission photodetector 942 is mixed with a constant-phase signal from the signal generator 912, delivering an error signal that indicates the optical length of the interferometer 936. Using the transmission error signal reduces the effects of fibre noise such as Rayleigh Back Scattering (RBS).

In the exemplary system 900, the laser 902 may be an external-cavity diode laser with a factory-estimated linewidth of 1 MHz, and an intrinsic linewidth of approximately 300 kHz, for example a New Focus Vortex 6029. Alternatively, the laser 902 may be a distributed feedback (DFB) laser, which is typically mechanically simpler and cheaper than an external-cavity diode laser.

The optical wavelength of the laser 902 may be centred at approximately 1550.15 nm, with a tuning range of approximately 0.40 nm. The central selected wavelength of the laser 902 may be tuned by applying a voltage to a piezoelectric transducer (PZT) in the laser itself, thereby changing the laser cavity length or in the case of DFB laser by changing temperature and current. After passing through the optical isolator 908, the laser polarisation may be adjusted to vertical by the half-wave plate 910 before being modulated at a phase modulation frequency (e.g., about 15 MHz, or 50 MHz) selected based on the FWHM of the FFPI mode, by the resonant phase modulator 916. The phase modulation frequency is selected to be as wide as possible while lying within the FWHM of the FFPI mode for sufficient transmission, and optimised experimentally. Alternatively, the phase modulator 916 is implemented as a radio-frequency (RF) current modulation, modulating the phase of the laser 902, e.g., in a distributed feedback (DFB) diode laser.

The phase modulator 916 may be driven by a radio frequency (RF) signal generator 912, which may also provide the local oscillator signal for the demodulation electronics, as discussed above. The modulated laser beam 918 may be coupled with an aspheric lens 924 into a fibre-pigtailed polarisation-independent optical circulator 928, spliced to a FFPI 936. A grating separation L is defined as the single pass effective optical path length between the Bragg Gratings 932, 934. The resonance frequency of the FFPI 936 can be tuned by either increasing or decreasing L, where an increase in L decreases the resonance centre frequency, while a decrease in L increases the resonance centre frequency. This tuning can be effected in a number of ways, including stretching, heating, cooling and compressing the FFPI 936 inside a length of tubing by compressing the tubing. In the geophone 100 (accelerometer) it is the acceleration of the ground relative to the proof mass 104 which stretches the FFPI 110. In the FFPI 110, the seismic signals effect strain changes, which "tune" the FFPI 110, which is interrogated by the laser 902.

The exemplary FFPI 936 can be formed by a pair of nominally matched Bragg gratings.

Both the transmitted Et and reflected Er signals may be collimated back into free space with aspheric lenses and then focussed onto the photodetectors 942 and 948, respectively, each with electronic bandwidth at least equal to or greater than (by about 20% or 30%) the phase modulation frequency of the phase modulator 916. The optical isolator 938 in the transmitted port is used to eliminate any parasitic etalon effects due to residual back reflections. The radio-frequency local oscillator (i.e., the signal generator 912) can be phase shifted via phase shifter 952 before being used to mix down the electronic signal from the reflected port.

The local oscillator phase shifter 952 may be optimised experimentally by maximising the error signal, thus providing a maximum signal-to-noise ratio for the system. Alternatively, dual-channel in-phase and quadrature detectors may be used to automatically optimise the phase. The optimum phase concerns the radio-frequency local oscillator phase that goes into the mixer 950 in order to generate the error signal. There are two mechanisms that can generate an error signal depending on the ratio of the modulator frequency ($v_m$) to the full-width half-maximum bandwidth ($\Delta v_{0.5}$) of the FFPI 936. For low frequency $v_m$ compared to $\Delta v_{0.5}$, the dominant mechanism is the relative change in one sideband with respect to the other sideband. For high frequency $v_m$ (i.e., $v_m \gg \Delta v_{0.5}$), the dominant mechanism is the phase rotation of the carrier with respect to both sidebands. The first mechanism requires a demodulation phase (local oscillator phase) 90 degrees away from the second mechanism.

Figure 10:
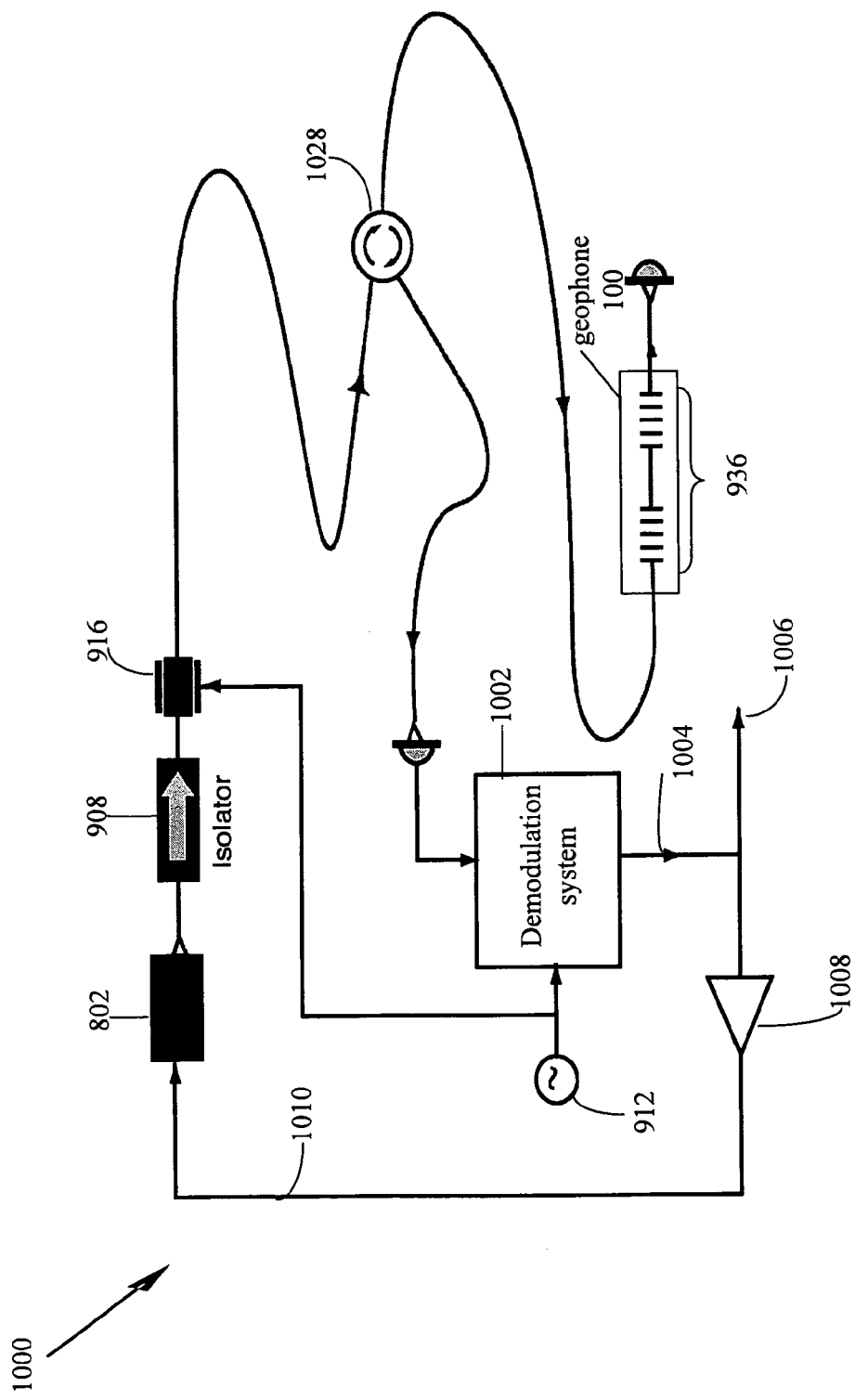
Figure 11:
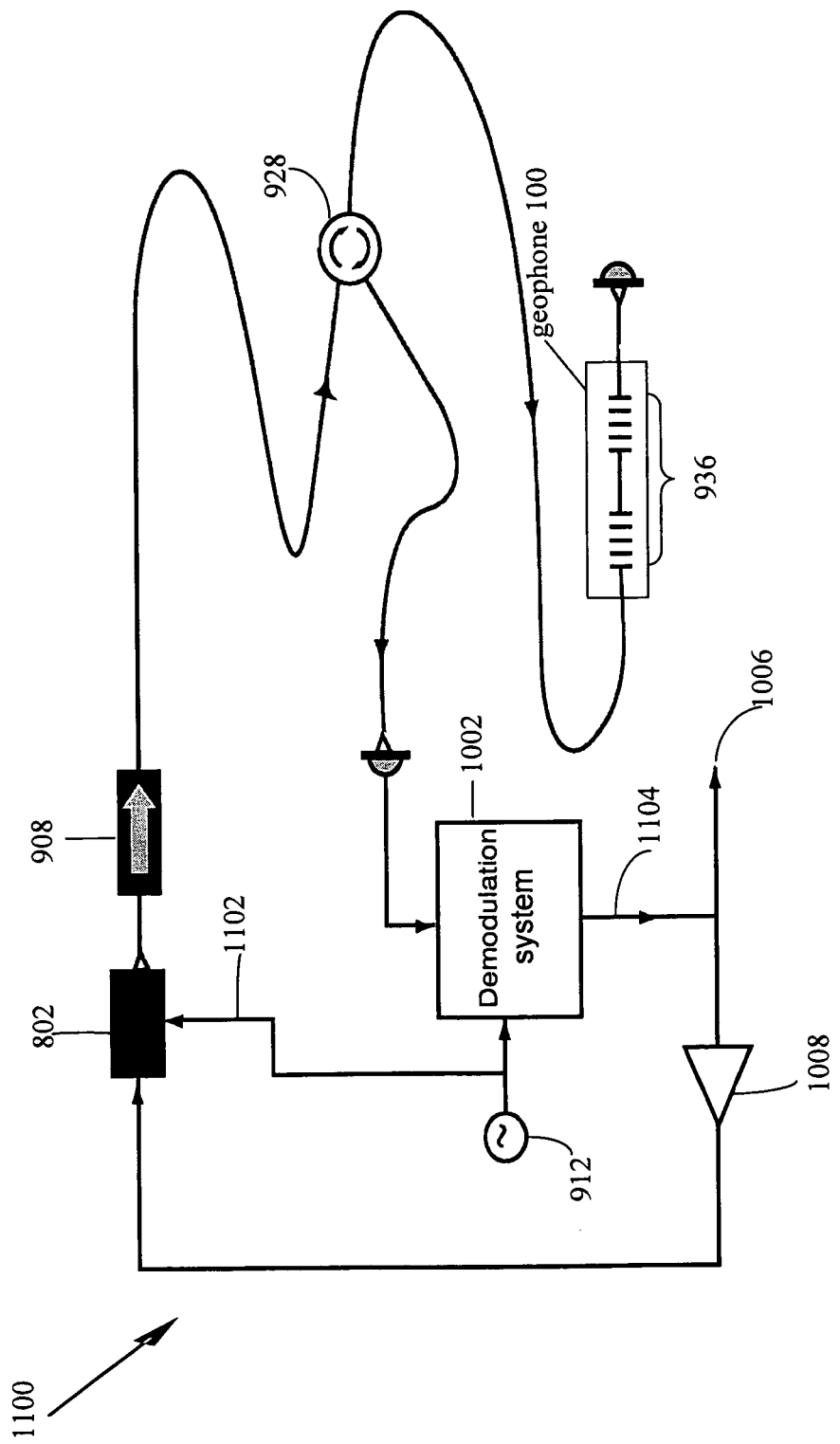

In an exemplary seismic detection system 1000 with feedback and wavelength control, as shown in FIG. 10, the error signal from a demodulation system 1002 is amplified and/or frequency-filtered by the amplifier 1008, then fed back into the wavelength controller, for example a piezoelectric device that tunes the cavity length of the laser 802. FIG. 11 shows a further exemplary seismic detection system 1100 with feedback, where the laser output is modulated by directly modulating the laser's drive current 1102, rather than phase-modulating the output externally with an external phase modulator 916.

Frequency locking the laser 802 to the FFPI 936 allows the laser 802 to follow a mode of the FFPI 936 as it changes frequency in response to thermal drift, and low frequency strain. At frequencies above thermal drift, the in-loop error signal (i.e., feedback 404) represents seismic/acoustic signals picked up the FFPI 936. For low frequencies the signal may be recovered with large dynamic range. The dynamic range of the system will be limited only by the interrogating laser's frequency tuning range. This error signal output is proportional to the strain induced in the FFPI 936 as a result of the acoustic signal impinging on the fibre. The low frequency dynamic range can be far larger than the full-width half-maximum (FWHM) of the FFPI mode, which is typically 100 to 200 MHz since the laser frequency tuning range can be in excess of 100 GHz, although the WDM channel width would limit it in practice (e.g., to about 20 GHz within a 60 GHz channel width of a 100-GHz spaced channel grid). Signals picked up by the geophone 100 above the unity gain frequency of the control loop can be accessed at the output of the demodulation system 1002. These are out-of-loop signals and the dynamic range will be limited by the FWHM of the FFPI mode width (e.g., 200 MHz) as they are in the frequency range above unity gain where the locking dynamics have a negligible effect, thus, the sensor dynamic range is optimised by maximising the control bandwidth.

The preferred technique for frequency locking the laser 802, 902 to the FFPI 110 is the Pound-Drever-Hall (PDH) locking scheme. In theoretical models of the Pound-Drever-Hall locking scheme, the interferometric sensor may be approximated by analysis of a free space resonant cavity; within the bandwidth of concern, the Bragg reflectors used in the FFPI 110, 936 are broadband, and both the reflectors and resonator refractive index are non-dispersive. At the optical carrier frequency $v$, the complex reflection response of a lossless FFP formed by two matched reflectors separated by distance L, both with amplitude reflection coefficient r, can be expressed as $$\tilde{F}(v) = \frac{\tilde{E}_r}{\tilde{E}_i} = \frac{r(1 - \exp(-i\theta(v)))}{1 - r^2 \exp(-i\theta(v))} = A(v)\exp[i\phi(v)]$$

where $E_r$ and $E_i$ are the reflected and incident electric fields; $\theta(v)=2\pi vnL/c$ is the round-trip phase in a material of refractive index n; and $A(v)$ and $\phi(v)$ are, respectively, the amplitude and phase response. The FFPI 110, 936 has a full-width half-maximum (FWHM) bandwidth of $\Delta v_{0.5}$.

The Pound-Drever-Hall locking scheme involves interrogating the FFPI 110, 936 with the laser carrier phase modulated at $v_m$, while measuring the reflected power with a photodetector. After electronic demodulation and low-pass filtering, this signal can be reduced to $$V(v) \propto 2\sqrt{P_c P_s} \times \left\{ \begin{array}{l} \Re[\tilde{F}(v)\tilde{F}^*(v_+) - \tilde{F}^*(v)\tilde{F}(v_-)]\cos(\psi) + \\ \Im[\tilde{F}(v)\tilde{F}^*(v_+) - \tilde{F}^*(v)\tilde{F}(v_-)]\sin(\psi) \end{array} \right\} \quad (1)$$

where the cross term $$\tilde{C}(v_\pm) = \tilde{F}(v)\tilde{F}^*(v_+) - \tilde{F}^*(v)\tilde{F}(v_-) \quad (2)$$
$$= A(v)A(v_+)\exp\{i[\phi(v) - \phi(v_+)]\} -$$
$$A(v)A(v_-)\exp\{i[\phi(v_-) - \phi(v)]\}$$

$v_+ = v + v_m$ and $v_- = v - v_m$; $P_c$ is the power in the carrier while $P_s$ is the power in each sideband. The phase shift $\psi$ is set to optimise the demodulated error signal. In general this is achieved when $$\psi = \tan^{-1}\left\{\frac{\frac{d[\Im[\tilde{C}(v_\pm)]]}{dv}}{\frac{d[\Re[\tilde{C}(v_\pm)]]}{dv}}\right\}_{\theta(v)=m2\pi}$$

where m is an integer. The round-trip phase $\theta(v)=m2\pi$ when the carrier is resonant with the FFPI 110, 936.

From equation (2), it can deduced that in the case of $v_m \ll \Delta v_{0.5}$, $\phi(v) - \phi(v_+)$ and $\phi(v_-) - \phi(v)$ are both very small, and so the expression is dominated by its real part. Conversely, when $v_m \gg \Delta v_{0.5}$, the sidebands are well outside the linewidth of the FFPI 110, 936 when the carrier is near resonance. In this case these phase-difference terms approach $\pi/2$ and the expression is dominated by its imaginary part. If the FFPI lineshape is symmetric and the carrier is at resonance, $A(v_+)=A(v_-)$ and $\phi(v)-\phi(v_+)=\phi(v_-)-\phi(v)$ for both cases, implying that equation (2), and hence equation (1), become zero. This is the usual lock point of the frequency servo. From equation (1), it is clear that when the cross term equals 0 (locked to resonance), the output $V(v)$ is equal to zero and independent of $P_c$ and $P_s$. Hence, when locked, the Pound-Drever-Hall system is immune to variations in laser intensity noise to the first order. In comparison, a fringe-side locking technique shows no implicit immunity to intensity noise, and requires additional intensity monitor and subtraction electronics.

The case where $v_m \gg \Delta v_{0.5}$ describes the classic Pound-Drever-Hall locking regime, involving high finesse Fabry-Perot cavities. The principles of operation behind both extremes are similar and, both will be referred to as Pound-Drever-Hall locking in this document.

For a given resonance FWHM, $\Delta v_{0.5}$, the frequency separation between the turning points of a Pound-Drever-Hall error signal is dependent on $v_m$. It approaches asymptotic values for both cases of $v_m \ll \Delta v_{0.5}$ and $v_m \gg \Delta v_{0.5}$.

On the other hand, for a given modulation frequency, the size—and therefore the slope—of the error signal is dependent on the FWHM bandwidth $\Delta v_{0.5}$. The error signal size approaches zero when $v_m \ll \Delta v_{0.5}$, but reaches an asymptotic value when $v_m \gg \Delta v_{0.5}$.

In the further exemplary seismic detection system with feedback 1100, as shown in FIG. 11, current modulation may be used to modulate the laser output. An example of a laser source is a DFB diode laser or a monolithic extended cavity diode laser. The wavelength of the laser may be tuned by changing the laser cavity length. The FFPI 936 may consist of a pair of nominally matched Bragg gratings with selected lengths and spacing. Demodulation and feedback are described above with reference to FIGS. 8 and 9. This error signal 1104 serves two purposes: (i) at the signal is used by the servo amplifier to feed back to the laser 802 to ensure the laser 802 stays locked to the centre of the FFPI resonance; and (ii) the error signal provides a dynamic strain readout of the FFPI 936.

Figure 12:
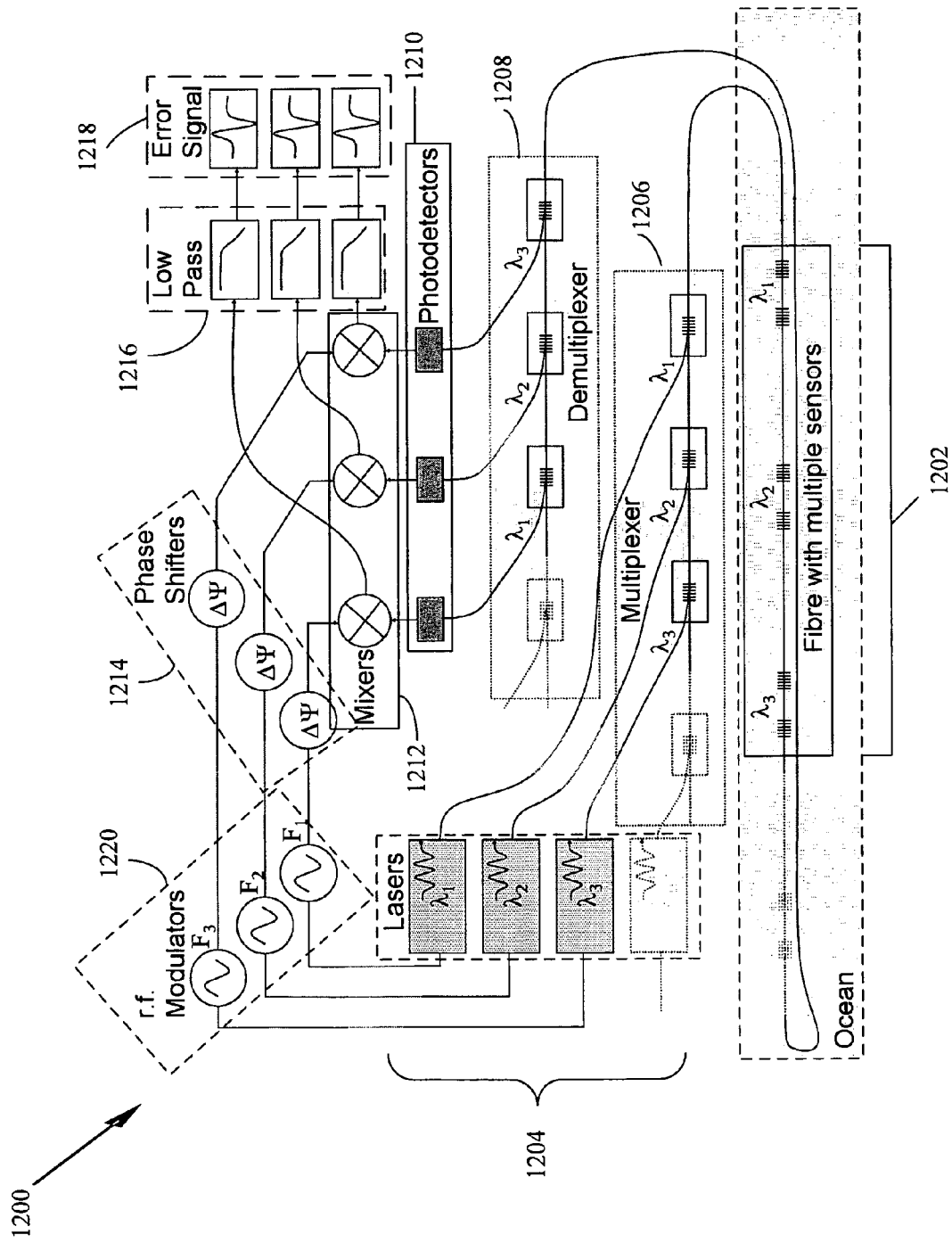

In a seismic array system 1200, as shown in FIG. 12, a plurality of modulated signals from a plurality of modulated laser sources 1204 are combined, using a Wavelength-Division Multiplexing (WDM) scheme, into a single optical fibre. A plurality of sensor elements 1202, each including a geophone 100 and a FFPI 936, is arranged in series along a single length of optical fibre. The sensors may be arranged such that the optical output signal comes from transmission through the interferometers, as depicted in FIG. 12, or such that the optical output signal arises from reflection from the interferometers, as explained above. Each interferometer in the fibre is responsive to light at a separate selected wavelength, $\lambda_1, \lambda_2, \lambda_3, \ldots$, in a WDM scheme; and each interferometer is interrogated by a beam of radiation corresponding to its operational wavelength. The wavelength spacing of the separate selected wavelengths typically may be about 0.8 nm (corresponding to a 100-GHz spacing), limited by available WDM systems and FFPI structures.

In the seismic array system 1200, the interrogating laser beams, each at a separate selected wavelength, arise from the plurality of separate laser sources, 1204, and the beams are combined with optical multiplexers 1206. The radiation from each laser has its central wavelength controlled by a corresponding wavelength controller, and is modulated by one of a plurality of radio-frequency modulators 1220. The plurality of optical output signals, indicative of the optical lengths of the interferometers, are directed to separate demodulators using an optical demultiplexer 1208, or similar optics. The optical output signals are demodulated via a plurality of photodetectors 1210, mixers 1212 and phase-shifted local oscillator signals (from the corresponding radio-frequency modulators 1220) in a manner described above for the single-interferometer apparatus. The demodulated signals are low-pass filtered and the error signals 1218 observed to indicate the optical lengths of the interferometers, and thus the seismic signals from the respective geophones 100. The error signals may be fed back to the wavelength controllers of the lasers 1204, thus enabling each laser to track the central wavelength of its corresponding interferometer via a frequency locking scheme such as the Pound-Drever-Hall technique described above.

An alternative realisation of the seismic array system 1200 has a single radio-frequency phase modulator downstream from the WMD optics that combine the plurality laser outputs into a single fibre. This topology reduces the use of external phase modulators down to a single modulator per fibre. In this apparatus, a plurality of laser sources at separate selected wavelengths, $\lambda_1, \lambda_2, \lambda_3, \ldots$, are combined using Wavelength-Division Multiplexing (WDM) optics and modulated using a single optical modulator, for example an external phase modulator. Only a single radio-frequency source is required to drive the modulator. The radiation from the lasers, combined into the single optical fibre, interrogates a plurality of interferometers, each responsive to a separate selected wavelength $\lambda_1, \lambda_2, \lambda_3, \ldots$. The optical output signals, gathered through transmission or reflection, are separated into separate channels, corresponding to the separate wavelengths, using WDM optics, then demodulated using separate mixers and separate electronic sensors. In one realisation of the apparatus, the error signals may be fed back to the wavelength controllers of the lasers, thus enabling each laser to track the central wavelength of its corresponding interferometer via a frequency locking scheme (eg the PDH scheme) as described above.

In a further alternative realisation of the seismic array system 1200, a plurality of optical output signals, arising from a plurality of interferometers in a single optical fibre, can share a single photodetector. In this apparatus, each laser output is modulated at a different radio frequency. After interrogation of each FFPI sensor, demodulation at each respective modulation frequency with a plurality of electronic mixers allows extraction of each acoustic sensor signal in isolation. This simplifies the detection optics by avoiding the need for splitter/combiner and other WDM optics at the array output. In one realisation of the apparatus, the error signals may be fed back to the wavelength controllers of the lasers, thus enabling each laser to track the central wavelength of its corresponding interferometer as described above.

Many modifications will be apparent to those skilled in the art without departing from the scope of the present invention as herein described.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A device for detecting seismic acceleration, including:
a proof mass;
a base for providing a sensor acceleration, relative to the proof mass, based on the seismic acceleration;
an optical fibre portion operatively connected between the proof mass and the base for providing a fibre tension based on the sensor acceleration, wherein the optical fibre portion is held in tension;
a fibre Fabry-Perot interferometer (FFPI) in the optical fibre portion for providing an optical characteristic representative of the fibre tension; and
a compensator for applying a compensating tension to the FFPI to compensate for a change of the optical characteristic due to a temperature change of the FFPI.

2. A device as claimed in claim 1, wherein the compensating tension is applied based on a temperature change of the compensator corresponding to the temperature change of the FFPI.

3. A device as claimed in claim 2, wherein the compensator includes an expanding member, between the base and the proof mass, arranged to change in length in a direction substantially parallel to the FFPI based on the temperature change of the compensator.

4. A device as claimed in claim 3, wherein the compensator includes a first non-expanding member substantially parallel to the FFPI between the base and the expanding member, and a second non-expanding member substantially parallel to the FFPI between the expanding member and the proof mass, wherein the expanding member is arranged to reduce stress applied to the FFPI as the expanding member expands.

5. A device as claimed in claim 1, wherein the optical fibre portion is in optical communication with an optical fibre for guiding light to interrogate the optical characteristic of the FFPI.

6. A device as claimed in claim 1, including a support spring for holding the optical fibre portion in tension, between the proof mass and the base.

7. A device as claimed in claim 6, including a guide for substantially limiting the sensor acceleration to be substantially parallel to the FFPI.

8. A device as claimed in claim 7, wherein the support spring includes a first cantilever in the form of a flexible strip secured between the proof mass and the base.

9. A device as claimed in claim 8, wherein the guide includes a second cantilever in the form of a flexible strip between the proof mass and the base, substantially parallel to the first cantilever, for guiding the proof mass.

10. A device as claimed in claim 1, wherein the FFPI is held at a tension selected to tune the FFPI to a selected optical wavelength in a wavelength-division-multiplexing (WDM) scheme.

11. A device as claimed in claim 1, wherein the FFPI includes an interferometer formed by two fibre Bragg gratings.

12. A system for detecting a seismic acceleration, including:
a device comprising:
a proof mass;
a base for providing a sensor acceleration, relative to the proof mass, based on the seismic acceleration;
an optical fibre portion operatively connected between the proof mass and the base for providing a fibre tension based on the sensor acceleration, wherein the optical fibre portion is held in tension;
a fibre Fabry-Perot interferometer (FFPI) in the optical fibre portion for providing an optical characteristic representative of the fibre tension;
a compensator for applying a compensating tension to the FFPI to compensate for a change of the optical characteristic due to a temperature change of the FFPI; and
a laser beam for interrogating the optical characteristic of the FFPI to detect the seismic acceleration.

13. A system for detecting seismic acceleration, including:
a plurality of single-longitudinal mode laser sources to each provide radiation at a corresponding plurality of selected wavelengths, and at least one modulator to frequency or phase modulate the radiation from each laser source;
a plurality of wavelength controllers to control the selected wavelengths of said laser sources;
a plurality of devices as claimed in claim 1, each device being responsive to one of the said plurality of wavelengths to each produce a reflected or transmitted optical output signal dependent on the optical characteristic of the corresponding FFPI; and
one or more demodulators to demodulate the optical output signals and produce a corresponding plurality of measurement signals indicative of optical characteristic of the corresponding FFPI.

14. A system as claimed in claim 13, wherein a selected high frequency range of the, or each, demodulator output provides the measurement signals.

15. A system as claimed in claim 13, wherein the wavelength controllers are dependent on feedback from the, or each, corresponding demodulator, and
the feedback is generated by a selected low frequency range of the, or each, corresponding demodulator output, and the feedback is used to maintain each selected wavelength of each laser source at a centre wavelength of each corresponding FFPI.

16. A system as claimed in claim 13, wherein radiation from each laser source is modulated at the same modulation frequency, and each optical output signal is directed to a separate demodulator using an optical demultiplexer.

17. A system as claimed in claim 13, wherein a modulator is provided for each laser source, and radiation from each laser source is modulated at a different modulation frequency, and the demodulators share a common optical detector.

18. A method for detecting seismic acceleration, including:
providing a sensor acceleration by a base, relative to a proof mass, based on the seismic acceleration;
providing a fibre tension based on the sensor acceleration by an optical fibre portion operatively connected between the proof mass and the base, wherein the optical fibre portion is held in tension;
providing an optical characteristic representative of the fibre tension using a fibre Fabry-Perot interferometer (FFPI) in the optical fibre portion; and
applying a compensating tension to the FFPI to compensate for a change of the optical characteristic due to a temperature change of the FFPI.

19. A method as claimed in claim 18, including applying the compensating tension to the FFPI based on a temperature change of a compensator corresponding to the temperature change of the FFPI.

20. A method as claimed in claim 18, including interrogating the optical characteristic of the FFPI using a laser beam to detect the seismic acceleration.

* * * * *